United States Patent [19]

Takagi

[11] Patent Number: 5,231,447
[45] Date of Patent: Jul. 27, 1993

[54] AUTOMATIC LIGHT ADJUSTMENT CAMERA AND EXCHANGABLE LENSES THEREFOR

[75] Inventor: Tadao Takagi, Yokohama, Japan

[73] Assignee: Nikon Corporation, Tokyo, Japan

[21] Appl. No.: 898,324

[22] Filed: Jun. 15, 1992

[30] Foreign Application Priority Data

Jun. 20, 1991 [JP] Japan .................. 3-176135

[51] Int. Cl.$^5$ .............................. G03B 15/05
[52] U.S. Cl. .................... 354/415; 354/403; 354/432; 354/416
[58] Field of Search ........... 354/415, 432, 403

[56] References Cited

U.S. PATENT DOCUMENTS

| | | | |
|---|---|---|---|
| 4,809,030 | 2/1989 | Takagi et al. | 354/414 |
| 4,905,035 | 2/1990 | Takagi et al. | 354/432 |
| 4,965,620 | 10/1990 | Takagi et al. | 354/416 |
| 5,164,759 | 11/1992 | Yasukawa | 354/415 X |
| 5,172,157 | 12/1992 | Takagi | 354/415 |

FOREIGN PATENT DOCUMENTS 63-83713 4/1988 Japan.

*Primary Examiner*—Michael L. Gellner
*Assistant Examiner*—Jae N. Noh
*Attorney, Agent, or Firm*—Shapiro and Shapiro

[57] ABSTRACT

An automatic light adjustment camera comprises a flash apparatus capable of performing preliminary flash emission and main flash emission; a photometric device for dividing the light beam emitted from the flash apparatus and reflected by a field into a plurality of photometric areas for photometry and outputting each photometric value; a light adjusting area determining device for determining the photometric areas which are allowed to contribute to light adjustment at the time of the main flash emission using the photometric values, photographing distances, and detection errors for the photographing distances at the time of preliminary flash emission; and a light adjusting device for performing light adjustment at the time of the main flash emission using the light adjusting areas determined by the light adjusting area determining device.

13 Claims, 24 Drawing Sheets

FIG. 11

| ENCODER POSITION | NOMINAL DISTANCE | FOCAL LENGTH | | | | | | | | | |
|---|---|---|---|---|---|---|---|---|---|---|---|
| | | 35 | | 37 | | 40 | | 4... | | 70 | |
| | | INFI-NITE | MIN-IMUM | INFI-NITE | MIN-IMUM | INFI-NITE | MIN-IMUM | INFI-NITE | ... | INFI-NITE | MIN-IMUM |
| 1 | 7.55 | 9.9 | 0.7 | 9.9 | 0.5 | 9.9 | 0.5 | 9. | | 9.9 | 0.2 |
| 2 | 5.66 | 0.5 | 0.5 | 0.4 | 0.4 | 0.4 | 0.4 | 0. | | 0.2 | 0.2 |
| 3 | 4.76 | 0.4 | 0.4 | 0.3 | 0.3 | 0.3 | 0.3 | | | 0.1 | 0.1 |
| 4 | 4.00 | 0.3 | 0.3 | 0.3 | 0.3 | 0.3 | 0.2 | | | 0.1 | 0.1 |
| 5 | 3.36 | 0.3 | 0.3 | 0.3 | 0.2 | 0.2 | 0. | | | 0.1 | 0.1 |
| 6 | 2.83 | 0.3 | 0.3 | 0.2 | 0.2 | 0.2 | 0 | | | 0.1 | 0.1 |
| 7 | 2.38 | 0.2 | 0.2 | 0.2 | 0.2 | 0.2 | | | | 0.1 | 0.1 |
| 8 | 2.00 | 0.2 | 0.2 | 0.2 | 0.2 | 0.1 | | | | 0.1 | 0.1 |
| 9 | 1.68 | 0.2 | 0.2 | 0.1 | 0.1 | 0.1 | | | | 0.1 | 0.1 |
| 10 | 1.41 | 0.1 | 0.1 | 0.1 | 0.1 | 0.1 | | | | 0.1 | 0.1 |
| 11 | 1.19 | 0.1 | 0.1 | 0.1 | 0.1 | 0.1 | | | | 0.1 | 0.1 |
| 12 | 1.00 | 0.1 | 0.1 | 0.1 | 0.1 | 0.1 | | | | 0.1 | 0.1 |
| 13 | 0.84 | 0.1 | 0.1 | 0.1 | 0.1 | | | | | 0.1 | 0.1 |
| 14 | 0.71 | 0.1 | 0.1 | 0.1 | 0.1 | | | | | 0.1 | 0.1 |
| 15 | 0.60 | 0.1 | 0.1 | 0.1 | 9.9 | | | | | 0.1 | 0.1 |
| 16 | 0.50 | 0.1 | 9.9 | 0.1 | 9.9 | | | | | 9.9 | 9.9 |

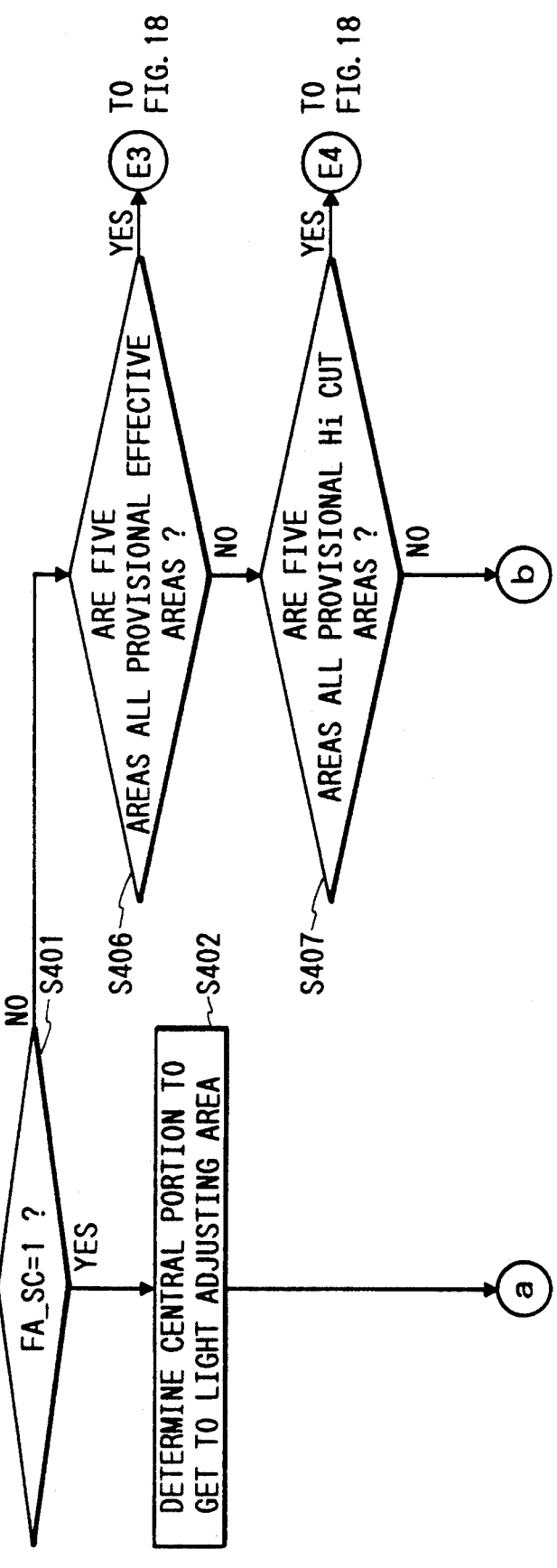

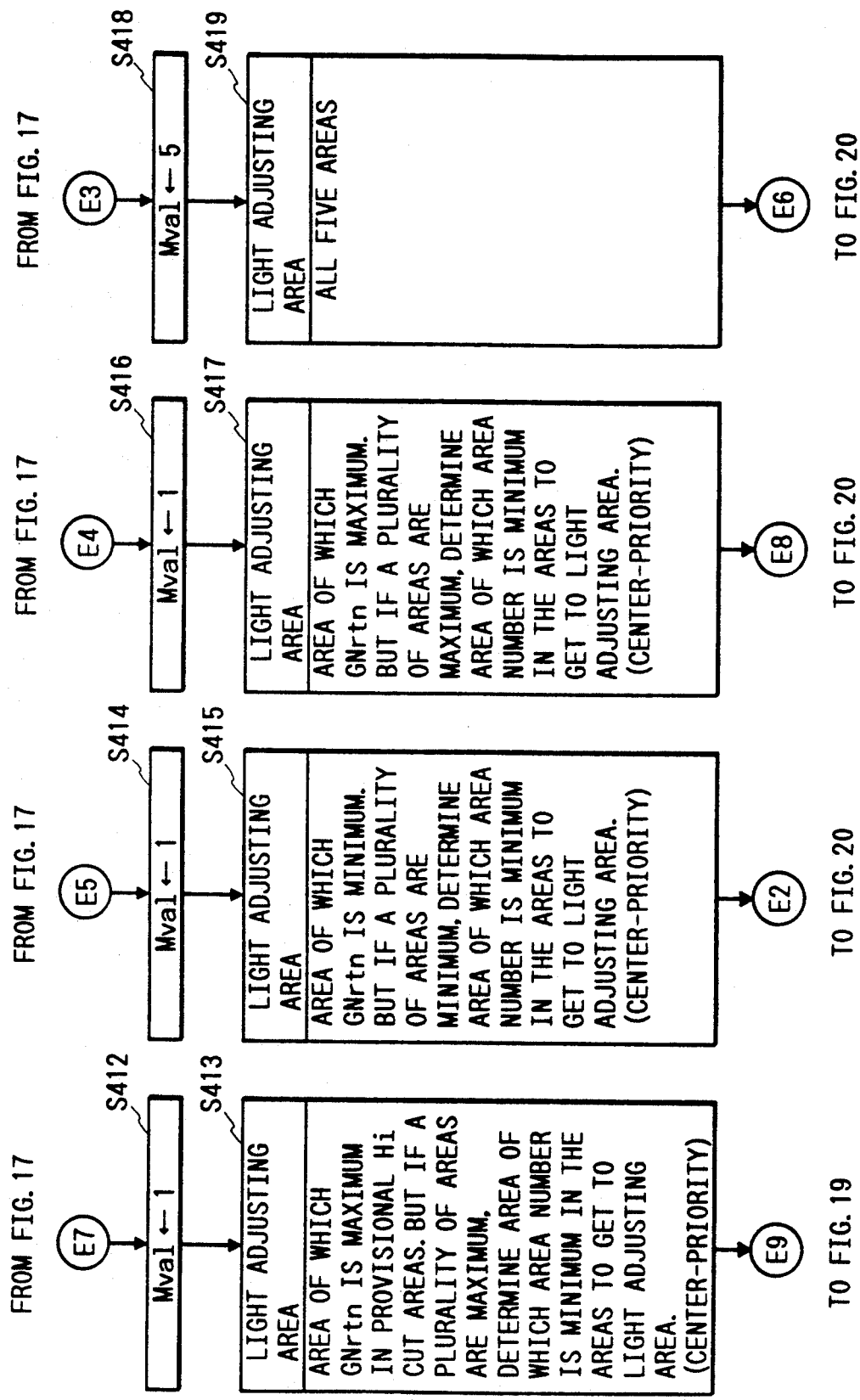

AUTOMATIC LIGHT ADJUSTMENT CAMERA AND EXCHANGABLE LENSES THEREFOR

BACKGROUND OF THE INVENTION

1. Field of the Invention

The present invention relates to an automatic light adjustment camera capable of dividing a field into a plurality of areas for photometry at the time of flash emission and conducting light adjustment in accordance with the result of the photometry, and the exchangeable lenses which can be mounted on this camera.

2. Related Background Art

As a camera of the king, there is a camera disclosed in U.S. Ser. No. 789,967 filed by the applicant hereof on Nov. 21, 1991, for example. The camera disclosed therein has an electronic flash apparatus capable of emitting preliminary flash and main flash, and conducts photometry by dividing the reflected light from the field at the time of preliminary flash emission into a plurality of photometric areas. Thus, on the basis of the photometric outputs and photographing distance, the photometric areas (effective areas) which are allowed to contribute to light adjustment at the time of main flash emission and the photometric areas (cut areas) which are not allowed to contribute thereto are determined. In this way, the light adjustment is performed in accordance with the photometric signals from the above-mentioned effective areas when the main flash is emitted.

In the above-mentioned camera, however, there is a possibility that if the detection accuracy of a photographing distance is not excellent, even an area where a main subject which should not be cut essentially is cut. In such a case, a problem is encountered that any correct exposure cannot be obtained. Particularly, when the photographing distance is long or the focus length of a photo-graphic lens is short, the detection accuracy of the film-to-object distance is lowered. Hence, a problem such as this tends to occur.

SUMMARY OF THE INVENTION

It is an object of the present invention to provide an automatic light adjustment camera capable of discriminating effective areas and cut areas accurately even when the detection accuracy of photographing distances is not excellent, and exchangeable lenses therefor.

Now, in accordance with FIG. 1, an automatic light adjustment camera according to an embodiment of the present invention will be described. In the camera embodying the present invention, there are provided a flash apparatus 101 capable of conducting preliminary flash emission and main flash emission; a photometric device 102 for conducting photometry by dividing the light beam emitted from the flash apparatus 101 and reflected by a field into a plurality of areas to output each of the photometric values; a light adjusting area determining device 103 for determining at least one photometric area which is allowed to contribute to light adjustment at the time of main flash emission on the basis of the photometric values at the time of preliminary flash emission, a photographing distance and the detection error for the photographing distance; and a light adjusting device 104 for conducting light adjustment at the time of main flash emission using the light adjusting areas determined by the light adjusting area determining device. Thus solving the above-mentioned problem.

The light adjusting area determining device 103 determines at least one photometric areas which is allowed to contribute to light adjustment at the time of main flash emission using the photometric values given by the photometric device 102 at the time of preliminary flash emission, the photographing distance which is inputted from a photographic lens, for example, and the detection error for photographing distance. The light adjusting device 104 performs light adjustment at the time of main flash emission using the light adjusting areas determined by the light adjusting area determining device 103. Thus, the at least one area which is allowed to contribute to light adjustment at the time of main flash emission is determined with an additional consideration of the detection error for the photographing distance. It is therefore possible to discriminate the effective area and cut areas accurately even when the detection accuracy of the photographing distance is not excellent.

Also, another embodiment according to the present invention is applicable to the photographic exchangeable lenses which can be mounted on the aforesaid camera, in which there are provided a detection device for detecting the photographing distance, and a storage for storing detection error for corresponding the photographing distances in advance.

Thus, it is possible to perform the above-mentioned control in the camera by inputting the detected photographing distance and the stored photographing distances into the camera.

BRIEF DESCRIPTION OF THE DRAWINGS

FIG. 11 is a view showing errors for nominal photographing distances at its minimum and infinite sides per focal length.

FIG. 18 is a flowchart which is continued from FIG. 17.

DETAILED DESCRIPTION OF THE PREFERRED EMBODIMENTS

Figure 1:
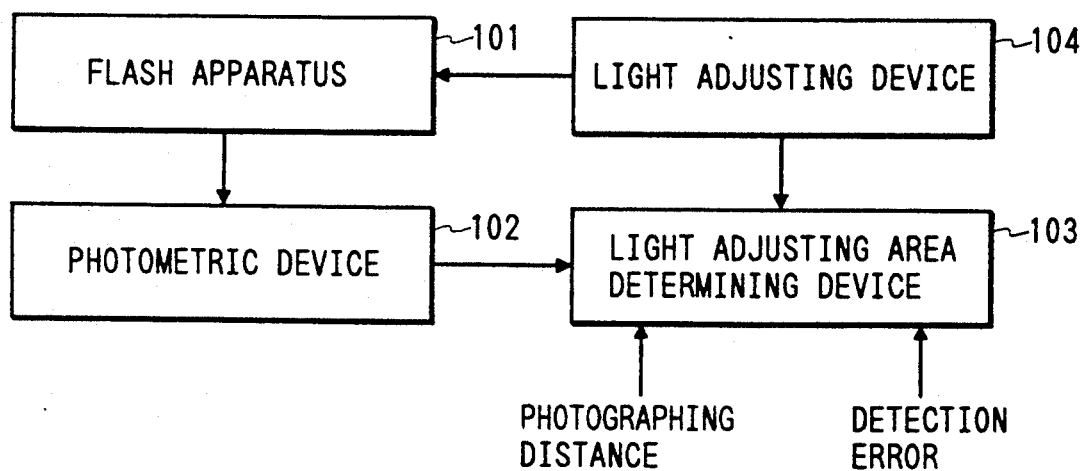
FIG. 1 is a schematic view showing the structure of an automatic light adjustment camera according to an embodiment of the present invention.
Figure 2:
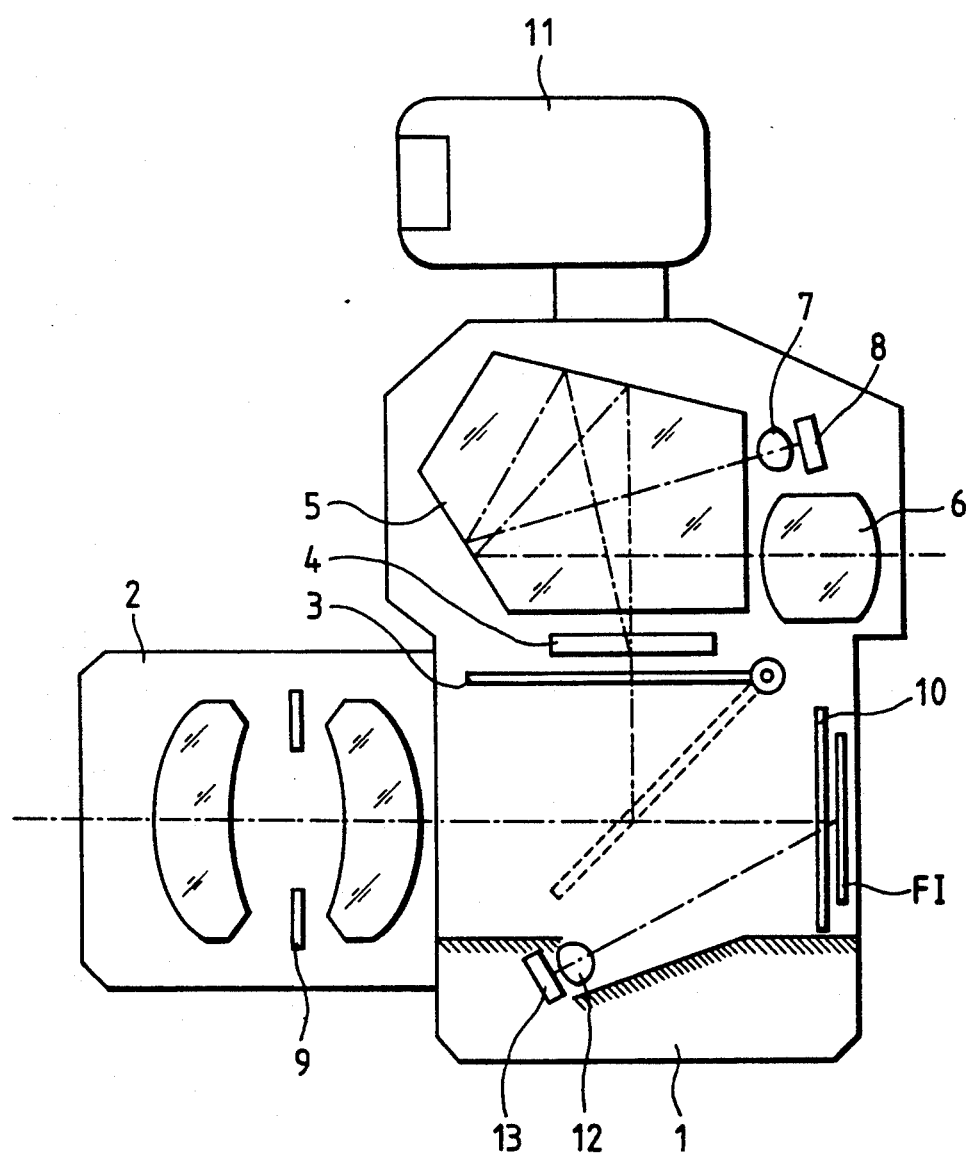
FIG. 2 is a view schematically showing the structure of an automatic light adjustment camera according to the present invention.

Now, in accordance with FIG. 2 to FIG. 24, an embodiment according to the present invention will be described. FIG. 2 is a view schematically showing the structure of a TTL automatic light adjustment camera. When observing from its finder, the light beam (static light) having passed the photographic lens 2 is reflected by a mirror 3 which is in the mirror down state as shown by a broken line, and a part thereof is guided to an ocular 6 through a screen 4 and pentagonal prism 5 while the other part is guided to an exposure calculation photometric element 8 through a condenser lens 7. Also, with a release button 32 shown in FIG. 3 being released for photographing, a diaphragm 9 is stopped down subsequent to the mirror 3 having been driven to the up position which is indicated by a solid line, and a shutter 10 is opened and closed. Thus, the objective light which passed the photographic lens 2 is conducted to a film FI and the film FI is exposed.

Also, at the time of conducting a flash photography, the electronic flash apparatus 11 emits a main flash to illuminate the subject after the shutter 10 is opened. Then, the reflecting light from the subject reaches the film surface through the photographic lens 2, and the light beam which is reflected from the film surface is received by the light receiving element 13 for the light adjustment through the condenser lens array 12. Furthermore, a camera according to the present embodiment is capable of conducting a preliminary flash emission for examining the state of the field prior to the above-mentioned main flash emission. The reflecting light of this preliminary flash emission from the field is reflected by the curtain surface of the shutter 10 before it is opened and is received by the light receiving element 13.

Figure 4:
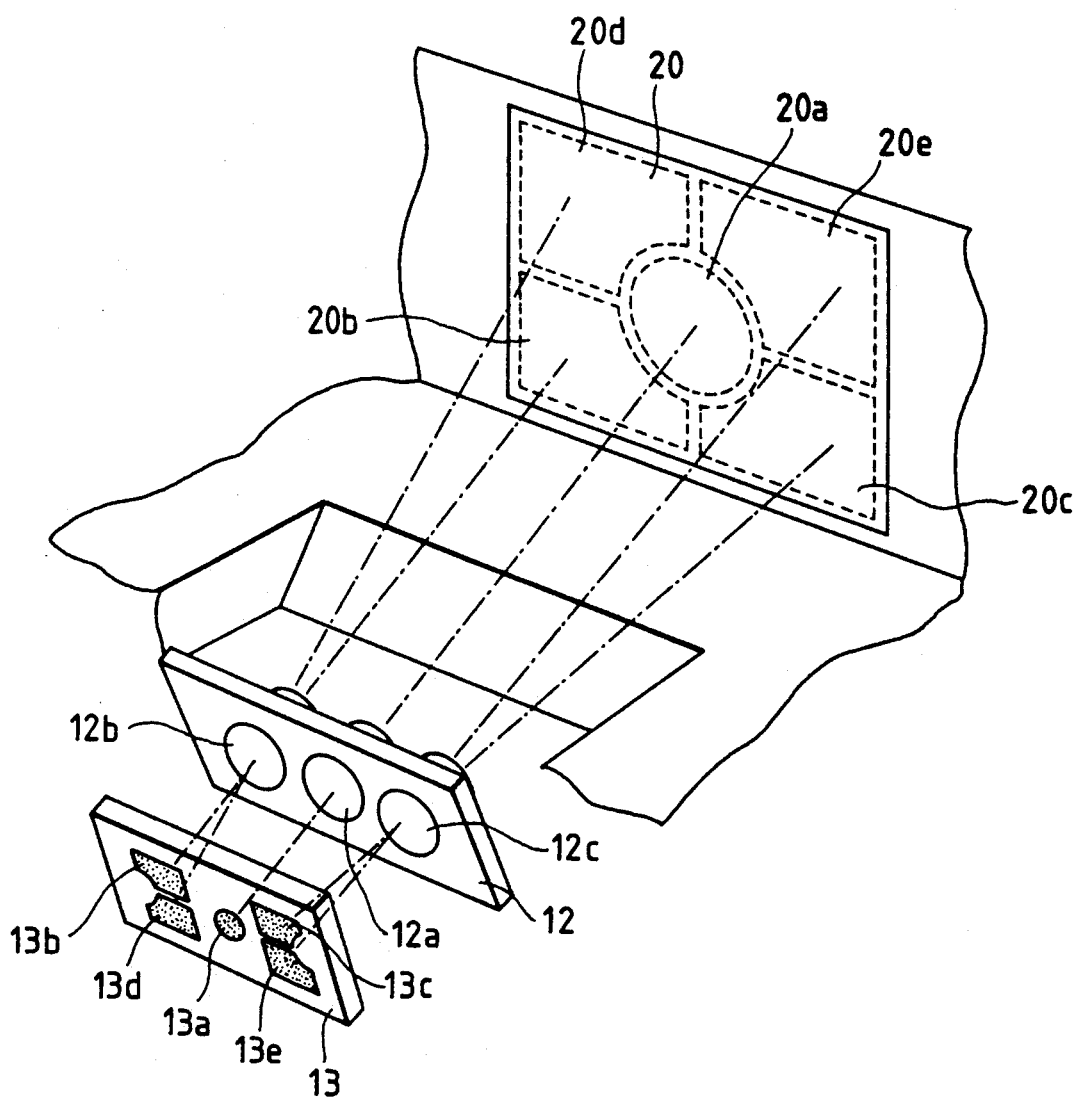
FIG. 4 is a perspective view showing the positional relationship between the segmented photometric element for a condenser lens array and a film.

On the same plane of the light receiving element 13, there are arranged as shown in FIG. 4 a segmented light receiving element 13a corresponding to the circular photometric area in the central portion of the field, and segmetermented light receiving elements 13b to 13e corresponding to the photometric areas of rectangular shapes each with a circular cut off on the periphery of the field. In other words, the field is divided into five photometric areas for the segmental photometry in the present embodiment. Also, condenser lens array 12 is an optical member having the three lens portions 12a to 12c which correspond to the three blocks, left, center, and right, of the above-mentioned light receiving elements 13a to 13e.

As shown in FIG. 4, when the exposure area 20 of one frame portion of the film surface is divided into five areas 20b to 20e, that is, the central circular portion 20a and the periphery which is divided into four, in the same way as the field, the above-mentioned mentioned three blocks, left, center, and right, of the light receiving elements 13a to 13e stand face to face with the left half, central, and right half portions of the film exposure area 20 through the three lens portions 12a to 12c of the condenser lens array 12 as indicated by broken lines, respectively. Further, as the light receiving element 13 and the film exposure area are substantially in a conjugate relation, the areas 20a to 20e are divided into five areas of almost the same shape for the photometry of its brightness.

Figure 3:
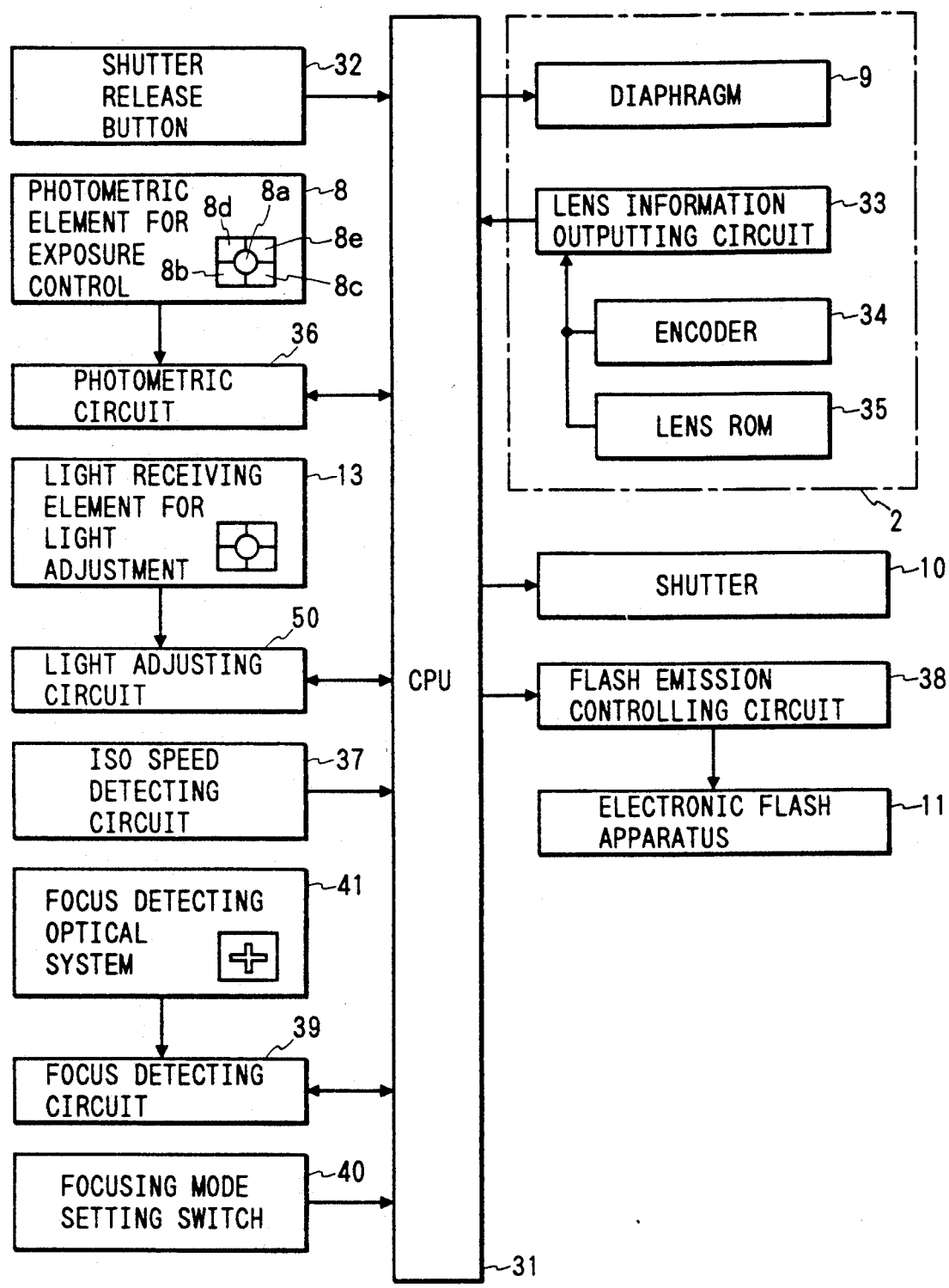
FIG. 3 is a block diagram showing the structure of the automatic light adjusting device of a camera.

FIG. 3 is a block diagram showing a control system, and to the CPU 31 which controls the sequences of a camera as a whole, a realease button 32 and shutter 10 are connected and at the same time, the diaphragm 9 in a photographic lens 2 and a lens information output circuit 33 are connected. From the lens information output circuit 33, there are inputted to the CPU 31 among some other, a photographing distance X detected by the known metering encoder 34 in a lens, diaphragm stop value $F_0$ stored in a lens ROM 35, exit pupil distance PO, and error $\Delta X$ in the photographing distance due to the resolution of the encoder 34.

Further, to the CPU 31, there are connected a photometric circuit 36 for operating photometry on the basis of the output from an exposure controlling photometric element 8, a light adjusting circuit 50 for operating light adjustment on the basis of the output from the light receiving element 13, that is, the segmented light receiving elements 13a to 13e, an ISO speed detection circuit 37 for reading the ISO speed of a loaded film FI from the DX code, and a flash controlling circuit 38 for the above-mentioned electronic flash apparatus 11. Here, the exposure controlling photometric element 8 comprises also five segmented photometric elements 8a to 8e which correspond to the respective photometric areas of the field as in the case of the light receiving element 13. Also, the known focus detection optical system 41 is to meter the distance of the central portion of an image plane, and its output is converted into a defocus amount $\Delta Y$ by the focus detection circuit 39 and inputted into the CPU 31.

Also, a focus adjusting mode setting switch 40 is the selection member which is provided to select either one of the three modes, S-AF (single AF mode) whereby to lock the photographic lens at a lens position where it is in focus with a subject after the start of the focusing, C-AF (continuance AF mode) whereby to perform focusing continuously as far as the release button is half depressed, and M (manual focus) mode.

Figure 5:
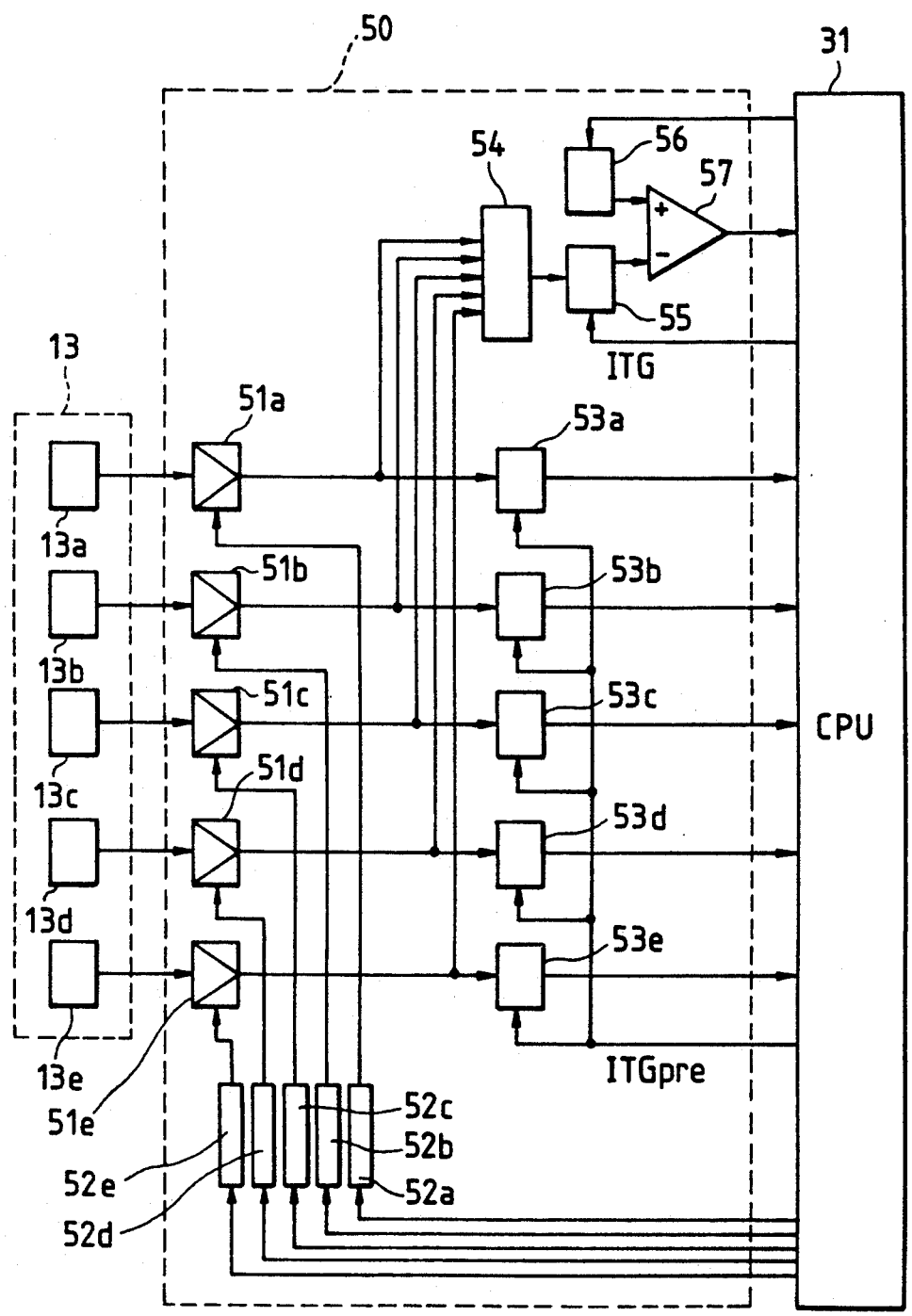
FIG. 5 is a view showing the details of a light adjusting circuit.

FIG. 5 is a detailed circuit diagram showing the light adjusting circuit 50 described above. The light adjusting circuit 50 has amplifiers 51a to 51e for amplifying the output from each of the segmented light receiving elements 13a to 13e, and gain setters 52a to 52e for setting the amplification factor of each of the amplifiers 51a to 51e in response to the instruction from the CPU 31. The gain setters 52a to 52e include D/A converters to convert digital signals from the CPU 31 into analogue signals.

Also, there are provided integrating circuits 53a to 53e for integrating the output of each of the amplifiers 51a to 51e at the time of the above-mentioned preliminary flash emission by times, respectively, in response to the instruction from the CPU 31, an adder circuit 54 for adding the output of each of the amplifiers 51a to 51e at the time of the main flash emission, an integration circuit 55 for integrating the results of additions of the adder circuit 54 by times in response to the instruction from the CPU 31, a converting circuit 56 for converting the light adjusting level (which will be described later in detail) stored as analogue signals in the CPU 31 in advance into digital signals, and a comparator 57 which compares the converted light adjusting level and the output of the above-mentioned integrating circuit 55 and outputs a flash stopping signal when the output of the integrating circuit 55 arrives at the above-mentioned light adjusting level.

Subsequently, in accordance with flowcharts shown in FIG. 6 to FIG. 24, the procedures for the CPU 31 to control a flash photography will be described.

Figure 6:
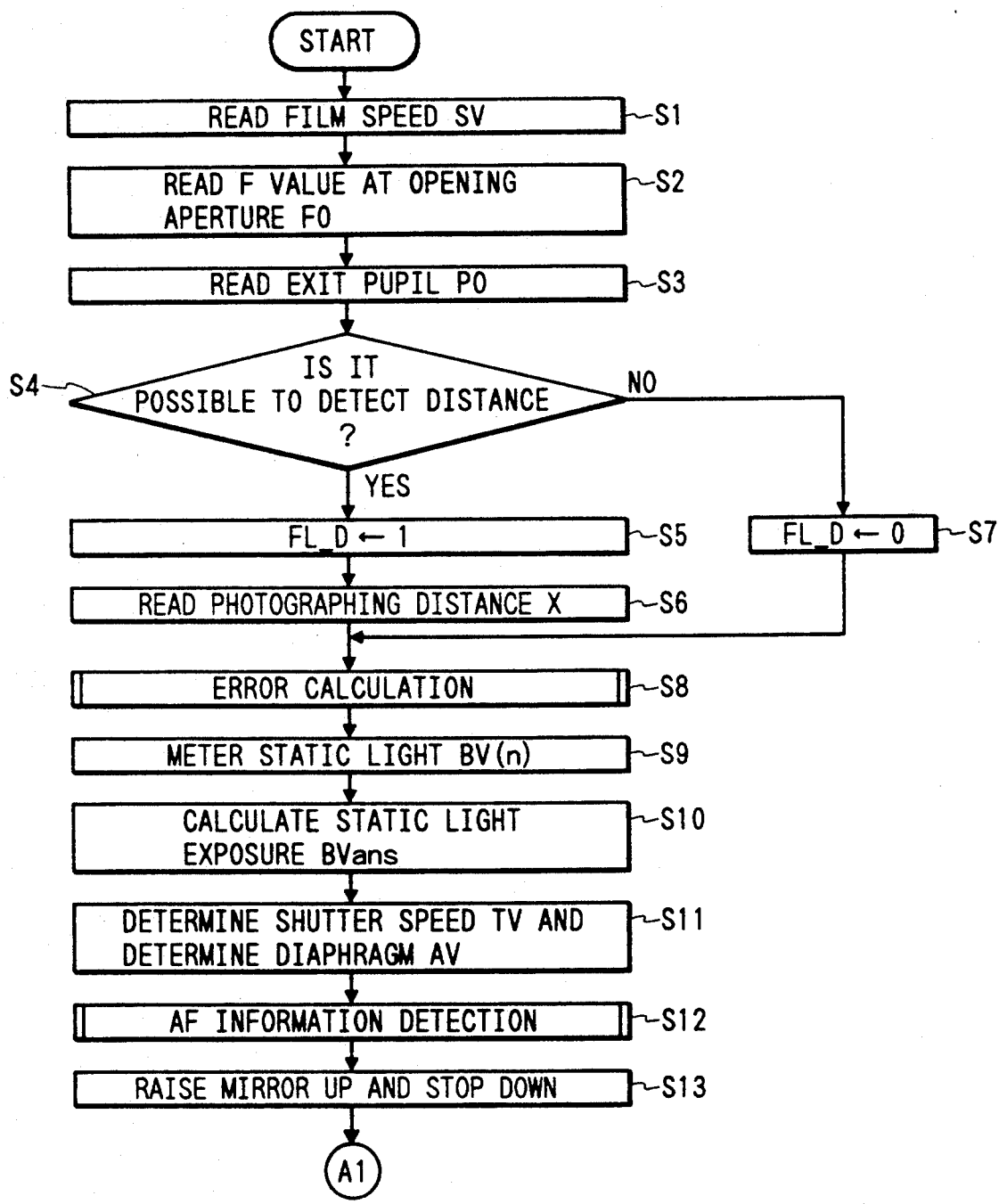
FIG. 6 is a main flowchart illustrating a flash photography control sequence.
Figure 7:
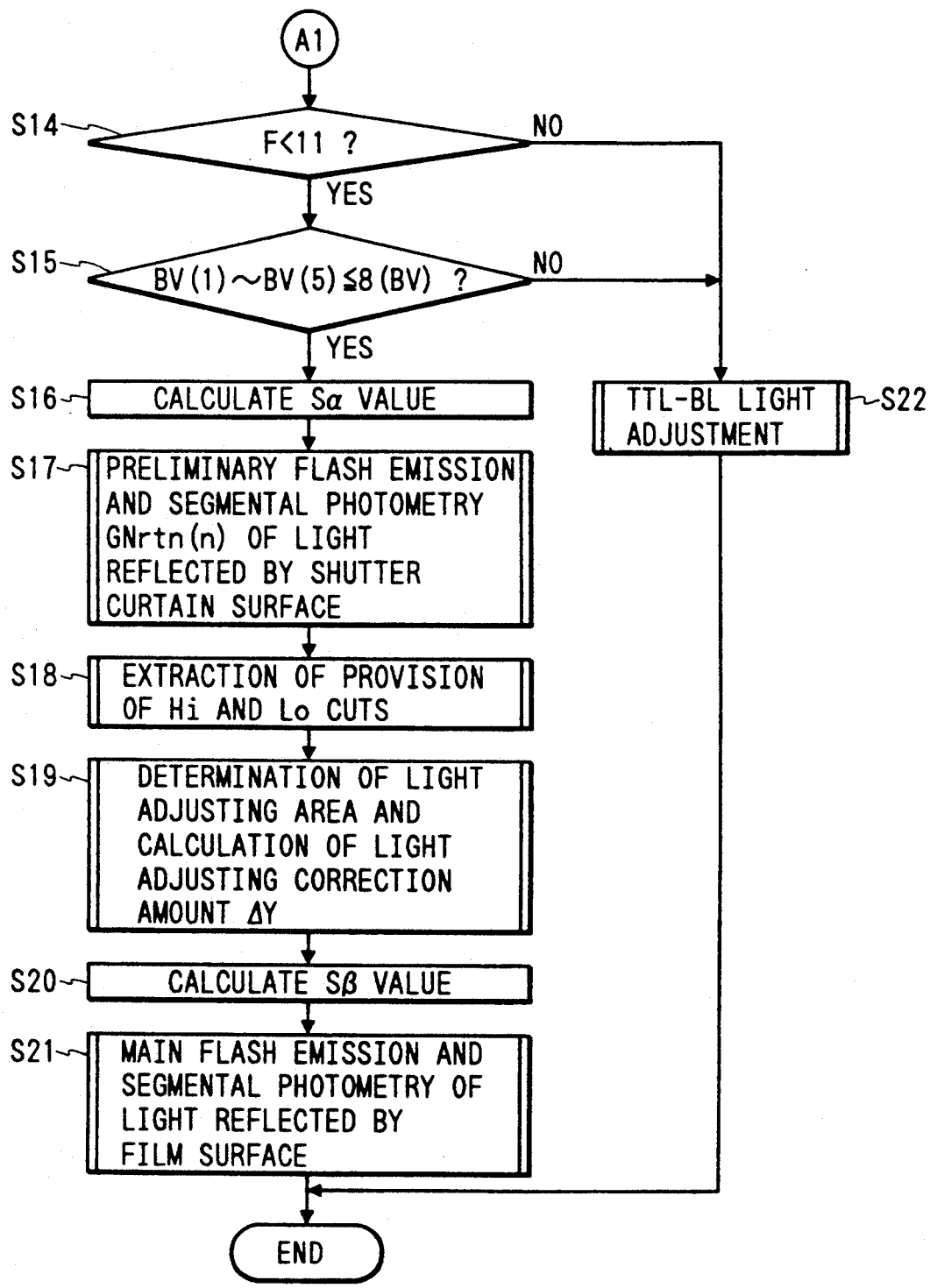
FIG. 7 is a flowchart which is continued from FIG. 6.

FIG. 6 and FIG. 7 show main flowcharts, and the processes in step S1 and on will be started when the release button 32 (FIG. 3) is fully released subsequent to the half releasing operation thereof. At first, in the step S1, the ISO speed SV of a loaded film FI is read by the ISO speed detecting circuit 37. Then, in step S2, the value at open aperture $F_0$ is read from the lens information output circuit 33 in the photographic lens 2, and in step S3, the exit pupil distance PO is read, respectively.

In step S4, whether a distance detection is possible or not is determined. For example, if the photographic lens 2 has an incorporated metering encoder 34 as shown in FIG. 3, the distance detection is possible. In such a case, 1 is assigned to the flag FL—D in step S5. If no metering encoder is incorporated in the photographic lens 2, any distance detection cannot be performed. In such a case, 0 is assigned to the flag FL—D in step S7. After the step S5, the photographing distance X which is a detection result of the encoder 34 is read through the lens information output circuit 33 in step S6. Then the process will proceed to step S8. Also, subsequent to the step S7, the process will proceed to step S8 directly.

In the step S8, errors are calculated. The results are used when the provisional Hi and Lo cuts are extracted as described later. The errors are briefly classified as a detection error of the photographing distance and an error due to the preliminary flash emission by the flash apparatus. The detection error of the photographing distance is further divided into the following:

(1) An error due to a lens barrel when the photographing distance is detected.

(2) An error due to the focusing conducted by the body when the photographing distance is detected.

The details of these processes will be described later in conjunction with FIG. 8 and FIG. 9.

In step S9, a photometry is conducted by a static light. In other words, the outputs of the above-mentioned five segmented photometric elements 8a to 8e (FIG. 3) are fetched into the photometric circuit 36. Then, by this photometric circuit 36, the luminance value BV (n) (n=1 to 5) logarithmically compressed for each of the photometric areas is read. Here, the n values 1 to 5 in the present embodiment are assumed to match the five photometric elements 8a to 8e or segmented light receiving elements 13a to 13e, respectively. Then, in step S10, the static light exposure BVans is calculated in accordance with each of the luminance values BV(n) and ISO speed SV which have been read. For this calculation, a method such as disclosed by the applicant hereof in FIG. 7 of U.S. Pat. No. 4,965,620 can be used, for example.

Then, the process will proceed to step S11 to determine a shutter speed TV and stop value AV in accordance with the calculated static light exposure BVans by the known program diagram and then proceed to step S12.

In the step S12, information regarding the focus adjustment is detected. Specifically, this information regards two events, that is, the focus adjusting mode and the focusing state. The focus adjusting mode means those modes mentioned above: the continuance AF mode, single AF mode, and manual mode. The focusing state means a condition of defocus amount. The details thereof will be described in conjunction with FIG. 12. Now, in step S13, the mirror 3 is elevated from the position indicated by the broken line in FIG. 2 to the position indicated by the solid line and at the same time, the diaphragm 9 is stopped down to the stop value AV determined in the step S11. Then the process will proceed to step S14 shown in FIG. 7.

Steps S14 and S15 in FIG. 7 are processes to determine whether preliminary flash emission should be conducted or not. In the step S14, if the stop value AV which is determined in the above-mentioned step S11 is found to be darker than a predetermined stop value (in the present ebodiment, F value being 11 or more), the probability is high that a small amount preliminary flash emission cannot be detected. Accordingly, the process will proceed to step S22 without conducting any preliminary flash emission. Also, in the step S15, if the static light is found sufficiently bright (here, all the BV(1) to BV(5) exceeding 8 BV), any preliminary flash emission is covered with the static light. Accordingly, in this case, too, the process will proceed to the step S22 without conducting any preliminary flash emission. In other cases, the process will proceed to the step S16. In the step S22, a TTL-BL light adjusting process, which does not perform any preliminary flash emission, is executed and the process will be terminated. This TTL-BL light adjusting process is disclosed in Japanese Patent Laid-Open Application No. 63-83713 filed by the applicant hereof. Therefore, its detailed description will be omitted.

In step S16, the correction coefficient $S\alpha(n)$ is calculated for each of the photometric areas for each photometric lens in accordance with the following equations with respect to the shutter curtain reflection photometry:

$$S\alpha(1)=1$$

$$S\alpha(2)=1-(1.2\times 10^{-3})\cdot PO$$

$$S\alpha(3)=1-(1.2\times 10^{-3})\cdot PO$$

$$S\alpha(4)=1+(1.7\times 10^{-3})\cdot PO$$

$$S\alpha(5)=1+(1.7\times 10^{-3})\cdot PO$$

Here, PO represents the exit pupil distance of the photometric lens 2. In other words, in this step S16, the above-mentioned lens correction coefficient $S\alpha(n)$ is obtained in order to evaluate the photometric signals of all the light receiving elements at one and the same condition because the light receiving conditions of the above-mentioned light receiving elements 13a to 13e are different depending on the exit pupil distances PO of the photometric lens 2.

In step S17, a preliminary flash emission is conducted to effectuate the segmental photometry of the reflection light from the shutter curtain surface, and in step S18, an extraction of the provisional photometric areas (cut areas) which do not contribute to light adjustment at the time of main flash emission which is performed on the basis of the result of the segmental photometry. In step S19, in accordance with the result of the process in the step S18, the photometric areas (effective areas) which are allowed to contribute to light adjustment at the time of main flash emission are determined and at the same time, the light adjusting correction value $\Delta Y$ is determined. The processes in these steps S17 to S19 will be described later in detail in conjunction with FIG. 13 to FIG. 22. In step 20, the correction value $S\beta(n)$ is calculated for each of the photometric areas of the photographic lens when the film surface reflection photometry (at the time of main flash emission) is conducted. Here, it is provisionally assumed that $S\beta(n)$ is equal to $S\alpha(n)$. Then, in step S21, the main flash emission is performed with the shutter 10 being fully opened and at the same time, the light adjusting operation is executed with the segmental photometry of the reflection light from the film surface. The details of this process will also be described later using FIG. 23 and FIG. 24.

Figure 8:
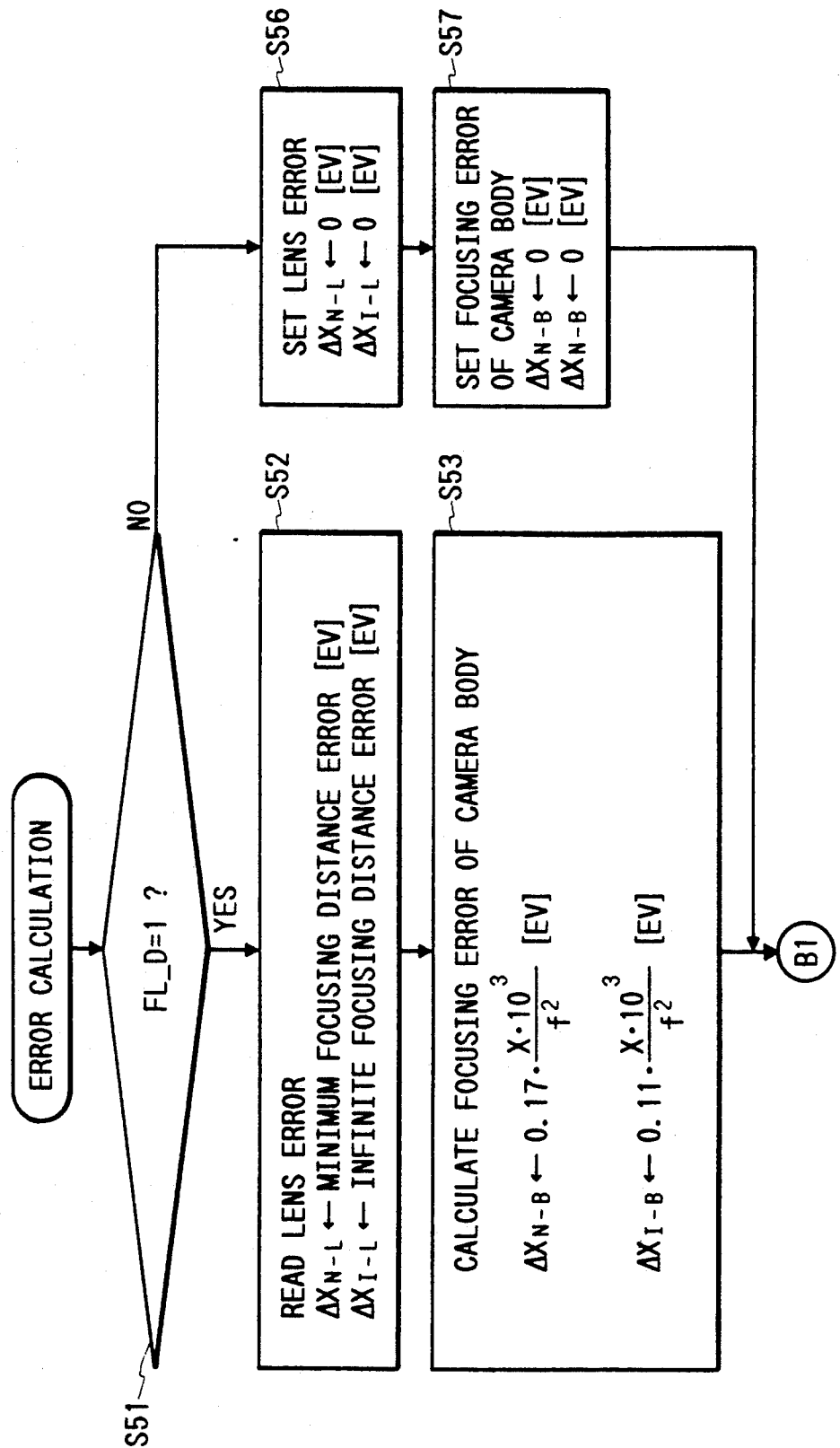
FIG. 8 is a subroutine showing the details of error calculation.
Figure 9:
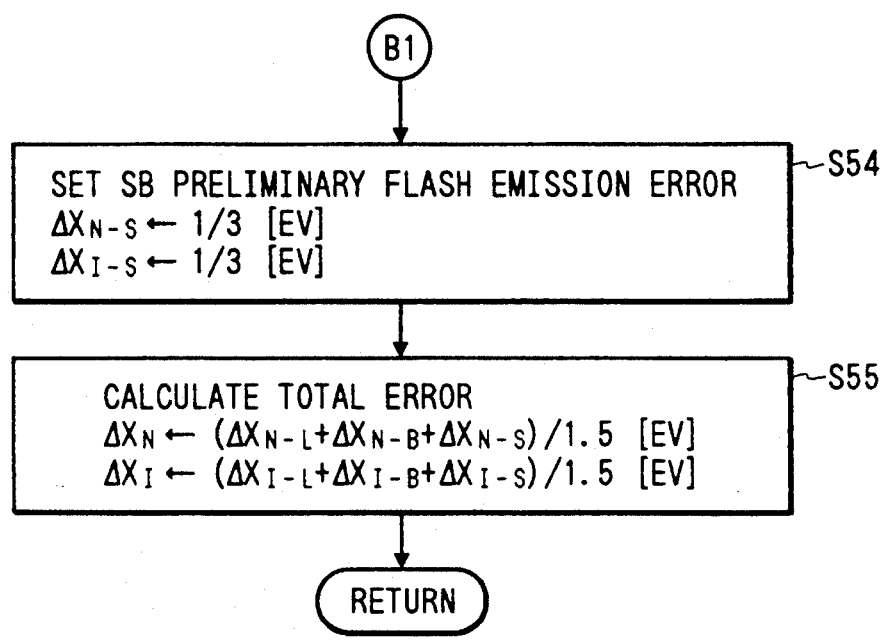
FIG. 9 is a flowchart which is continued from FIG. 8.

FIG. 8 and FIG. 9 are flowcharts showing the process in the step S8 in FIG. 6, that is, the details of error calculations.

Figure 10:
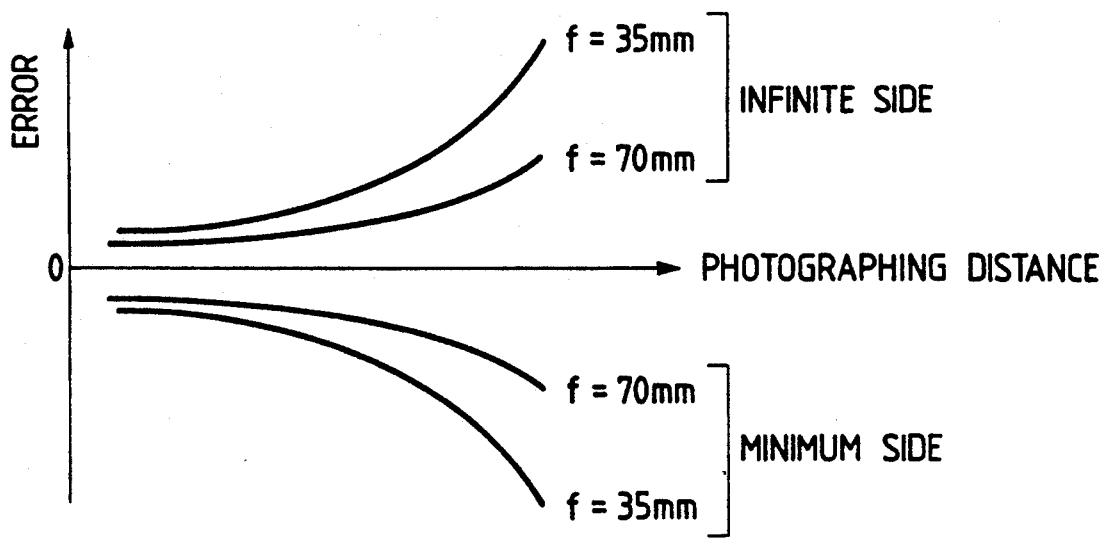
FIG. 10 is a view showing the relationship between the film-to-object distance, focal length, and photographing distance detection error.

In step S51, when the flag FL_D=1 is confirmed, that is, the case where the metering encoder is incorporated in the photometric lens 2 to enable distance detections, the process will proceed to step S52. In the step S52, a distance detection error $\Delta X$ regarding the photographic lens stored in the ROM 35 in the photographic lens 2 is read through the lens information output circuit 33. In this distance error $\Delta X$, there are a minimum side error $\Delta X_{N-L}$ and an infinite side error $\Delta X_{I-L}$ respectively for a nominal photographing distance X, and both of them are assumed to be stored in the lens ROM 35 in advance. The unit is defined as EV. Here, FIG. 10 is a view showing the relations between the film-to-object distance X, focal length f, and distance detection error $\Delta X$, in which the farther the photographing distance X is, and the wider the angle of image becomes, the greater becomes the distance detection error. FIG. 11 represents a part of the error data held by the photographic lens 2. FIG. 11 is a table containing the minimum side error $\Delta X_{N-L}$ and infinite side error $\Delta X_{I-L}$ for the nominal film-to-object distance X and focal length at sixteen stages of encoder positions. Here, in FIG. 11, the minimum side error at the closest photographing distance (encoder position 16) and the infinite side error at the fartherest photographing distance (encoder position 1) are both 9.9 (the value which can be assumed to be of infinity), and the reason therefor will be described later.

Now, the process will proceed to step S53 to calculate the distance detection error regarding the focusing by the camera body. To simplify the operational expression, an approximation is given as follows:

for the minimum side error $\Delta X_{N-B}$, $$\Delta X_{N-B} = 0.17 \cdot (X \cdot 10^3) / (f^2)$$

for the infinite side error $\Delta X_{I-B}$, $$\Delta X_{I-B} = 0.11 \cdot (X \cdot 10^3) / (f^2)$$

Here, the unit of the focal length f is mm while the unit of the photographing distance X is m. The unit of error $\Delta X$ is EV. As clear from FIG. 11, the distance detection error regarding the focusing by the body is calculated so that it is proportional to the photographing distance and inversely proportional to a square of the focal length.

Then, in step S54 in FIG. 9, the error regarding the preliminary flash emission of the flash apparatus 11 is set. The setting value for the minimum side error $\Delta X_{N-S}$ is, $$\Delta X_{N-S} = \tfrac{1}{3}$$

The one for infinite side error $\Delta X_{I-S}$ is, $$\Delta X_{I-S} = \tfrac{1}{3}$$

Both are a constant value. The unit for the error $\Delta X$ is EV.

In step S55, the total of each of the above-mentioned errors is calculated. In other words, the minimum side total error $\Delta X_N$ is, $$\Delta X_N = (\Delta X_{N-L} + \Delta X_{N-B} + \Delta X_{N-S}) / 1.5$$

The infinite side total error $\Delta X_I$ is,
$$\Delta X_I = (\Delta X_{I-L} + \Delta X_{I-B} + \Delta X_{I-S}) / 1.5$$

Both are a constant value. The unit for the total error $\Delta X$ is EV.

Subsequently, the process will return to the initial steps shown in FIG. 6.

On the other hand, if the flag FL_D is not found to be 1 in the step S51, that is, the case where no distance encoder is incorporated in the photographic lens 2 and any distance detection is impossible, the process will proceed to step S56.

In the step S56, the distance detection error $\Delta X$ regarding the photographic lens is set. In other word, the minimum side error $\Delta X_{N-L}$ is, $$\Delta X_{N-L} = 0$$

The infinite side error $\Delta X_{I-L}$ is, $$\Delta X_{I-L} = 0$$

In the step S57, the distance detection error $\Delta X$ regarding the focusing by the body is set. In other word, the minimum side error $\Delta X_{N-B}$ is, $$\Delta X_{N-B} = 0$$

The infinite side error $\Delta X_{I-B}$ is, $$\Delta X_{I-B} = 0$$

Then, the process will proceed to step S54.

Figure 12:
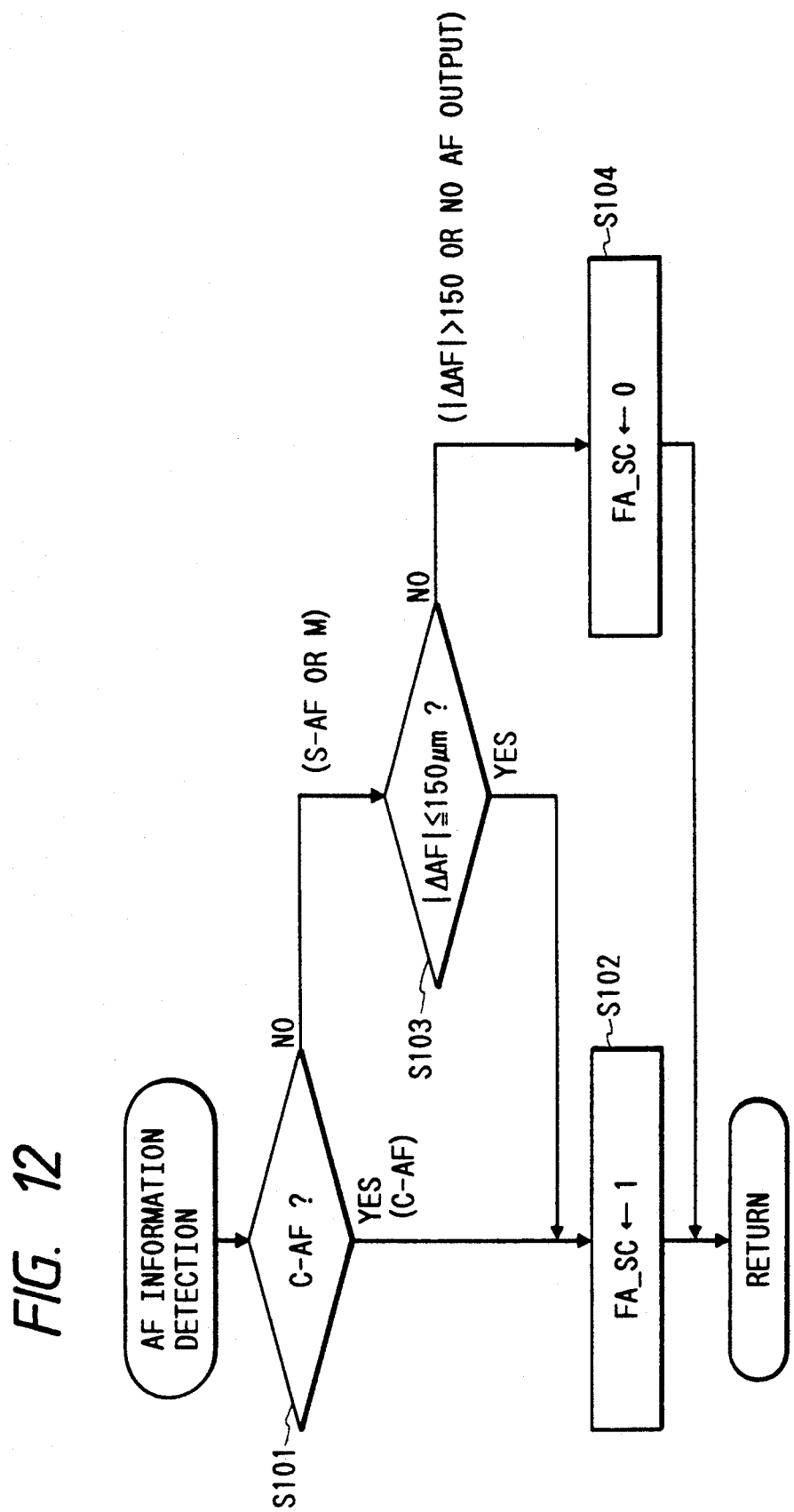
FIG. 12 is a subroutine flowchart showing the details of an AF information detection process.

FIG. 12 is a flowchart showing the process in the step S12 in FIG. 6, that is, the details of the AF information detection.

At first, in step S101, the discrimination of the focus adjusting modes is performed. If it is found that the above-mentioned C-AF has been set as a focus adjusting mode, the main subject is assumed to be overlapped with the focus detecting zone of the image plane (the central portion of the image plane), and the process will proceed to step S102 to assign 1 to the flag FA_SC. Also, if either S-AF or M has been set, it is not clear whether the main subject is overlapped with the focus detecting zone of the image plane or not. Thus, the process will proceed to step S103 to determine whether or not the absolute value $|\Delta Y|$ of the defocus amount $\Delta Y$ immediately before photographing is 150 μm or less. Then, if the $|\Delta Y|$ is less 150 μm or less, the main subject is assumed to be overlapped with the focus detecting zone, and the process will proceed to step S102 to assign 1 to the flag FA_SC. Also, if the $|\Delta Y|$ is not 150 μm or less, the main subject is not assumed to be overlapped with the focus detecting zone or considered unclear. Thus, the process will proceed to step S104 to assign 0 to the flag FA_SC, and return to the process in FIG. 6.

Figure 13:
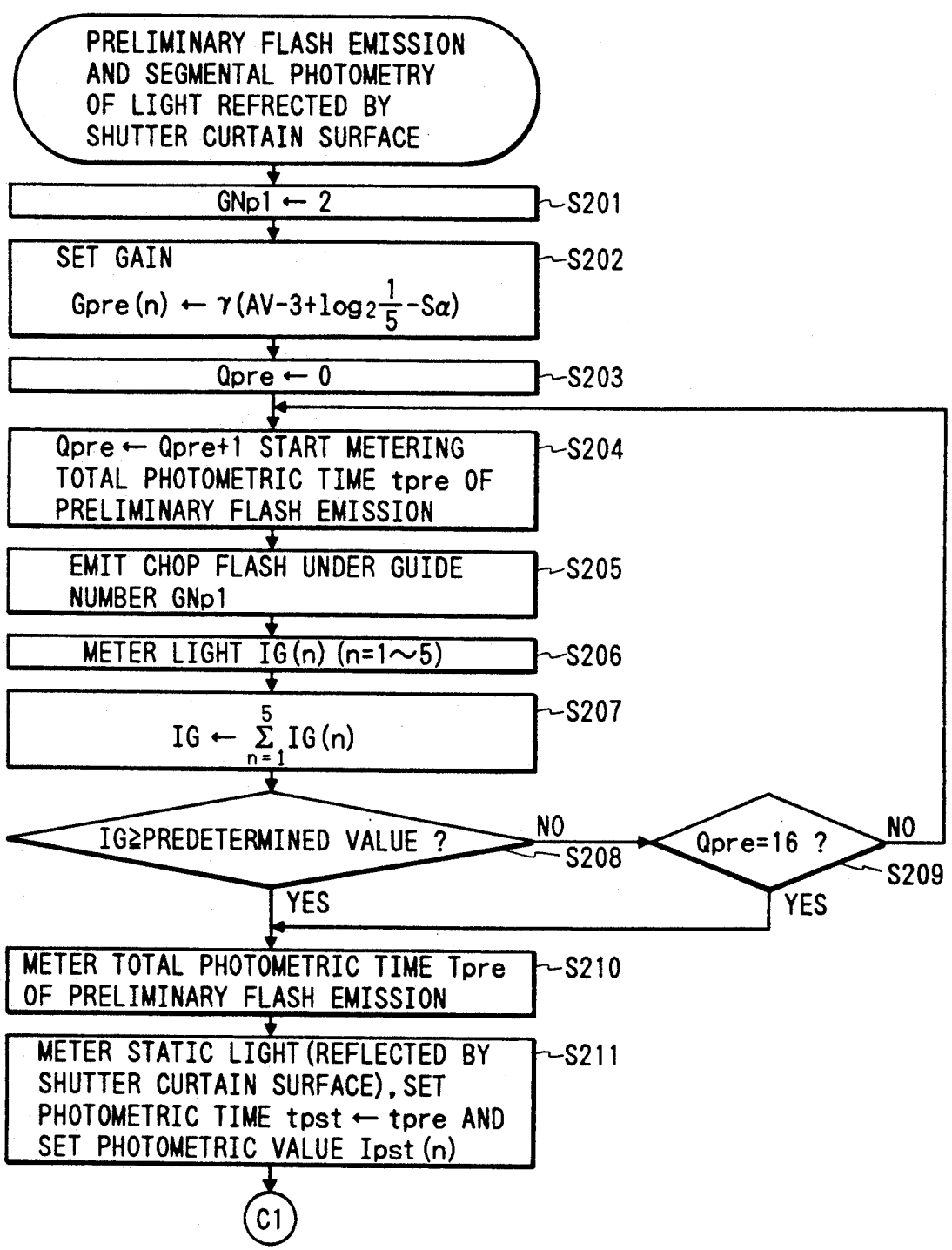
FIG. 13 is a subroutine flowchart showing the details of a photometric process at the time of preliminary flash emission.
Figure 14:
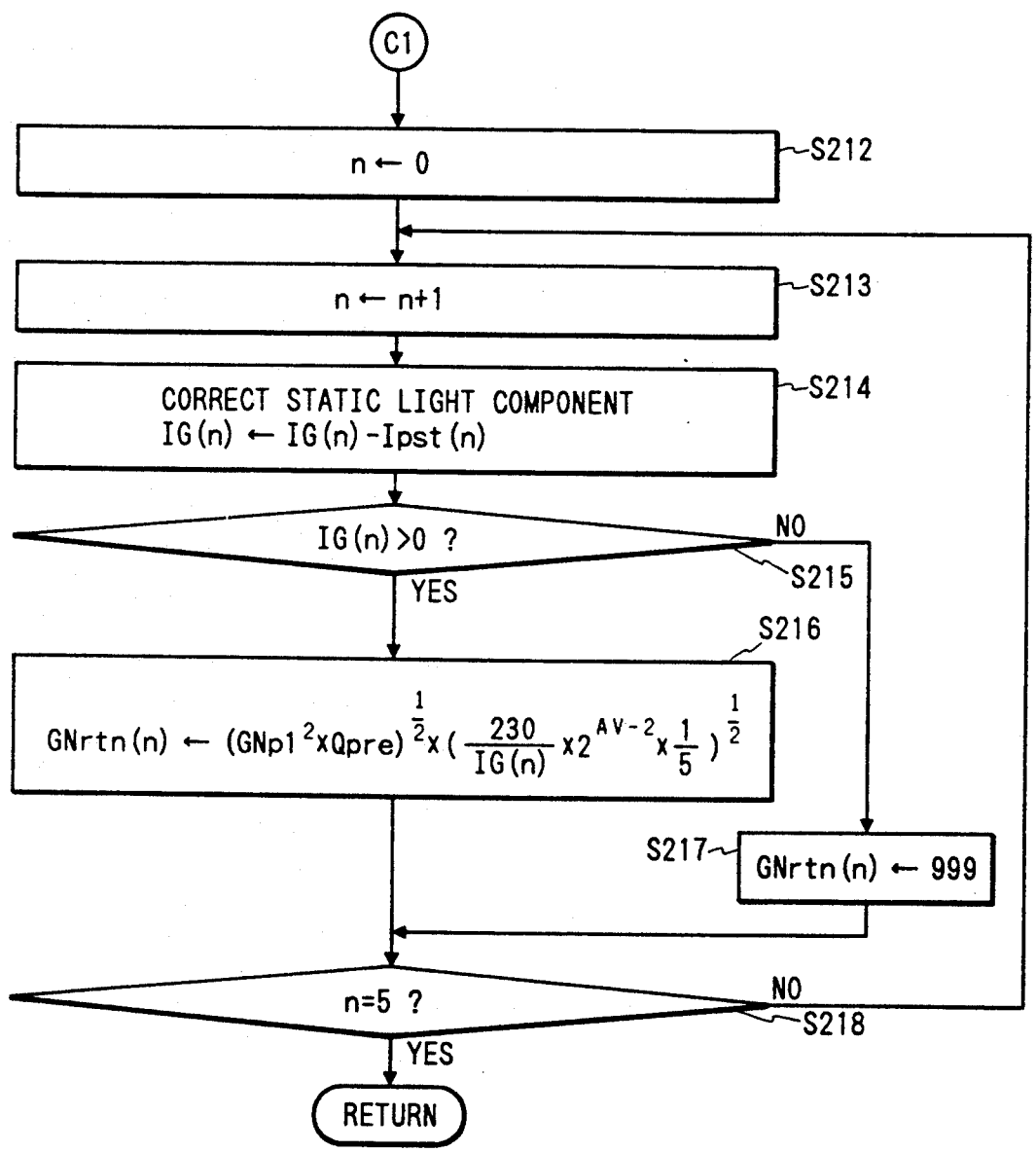
FIG. 14 is a flowchart which is continued from FIG. 13.

FIG. 13 and FIG. 14 are flowcharts showing the process in the step S17 in the above-mentioned FIG. 7, that is, the details of the process to perform preliminary flash emission.

At first, in step S201 in FIG. 13, the guide number GNpl per preliminary flash emission is given as 2. In other words, a chop flash having its guide number 2 as preliminary flash is emitted for several times in the present embodiment. In step S202, using the above-mentioned lens correction coefficient Sα(n) obtained in the step S15, a gain Gpre(n) to be given to the gain setters 52a to 52e (FIG. 5) of the above-mentioned light adjusting circuit 50 is obtained by the following equation:

$$Gpre(n) = \gamma(AV - 3 + \log_2(1/5) - S\alpha(n))$$

In step S203, the chop flashing number Qpre is zero reset. Then, the Qpre is incremented by 1 in step S204. At the same time, the clocking is started for the photometric time for the preliminary flash emission. The process will proceed to step S205. In the step S205, the chop flash is emitted for one time with the above-mentioned guide number GNpl (GNpl=2) and in step S206, its photometry is executed. In other words, the light beam of the chop flash is reflected by the field to form a primary image on the curtain surface of the shutter 10 through the photographic lens 2. This primary image is divided into five, and each of them is received by each of the five segmented light received elements 13a to 13e through the condenser lens array 12 shown in FIG. 4. Each of the segmented light receiving elements 13a to 13e inputs the photometric value corresponding to each of the light receiving values into the amplifiers 51a to 51e of the above-mentioned light adjustment circuit 50 sequentially.

Each of the amplifiers 51a to 51e amplifies the inputted gain signal respectively with the gain Gpre(n) of each gain setter 52a to 52e (obtained in the step S202) and inputs the amplified value into each integrating circuit 53a to 53e. The CPU 31 outputs the operational signal to each of the integrating circuits 53a to 53e. Then, the integrating circuits 53a to 53e integrate the amplified signals mentioned above by times in response to the operational signals and input them into the CPU 31 as IG(n) (n=1 to 5), respectively.

Now, in step S207, the total sum of the five photometric signals IG(n) mentioned above is obtained as IG, and the process will proceed to step S208. In the step S208, if it is found that the above-mentioned IG is less than a predetermined amount (here, 230), the process will proceed to step S209. Then, if the chop flash number Qpre is found to be less than 16, the process will return to the step S204 to repeat the processes described above. In the step S208, if the IG reaches 230 or in the step S209, the Qpre reaches 16, the process will proceed to step S210. In the step S210, the measured time from the start of clocking in the above-mentioned step S204 is taken as the total photometric time tpre required for conducting the photometry for preliminary flash emission. Then, the process will proceed to step S211.

In the step S211, the photometry of the static light is performed by the same optical system which has conducted the preliminary flash emission. The photometric time tpst at that time is assumed to be the same as the total photometric time tpre. Then, the photometric value of the static obtained here is given as Ipst(n).

Subsequently, in the steps S212 to S218 shown in FIG. 14, the correction of the static light component and GNrtn calculation are performed for the five outputs n=1 to 5. At first in the step S212, zero is assigned to n. Then, in the step S213, n is incremented by 1. In the step S214, a correction is made by subtracting the static light component Ipst(n) from the above-mentioned IG(n) which contains the preliminary flash component and static light component. Then, the value thus obtained is assigned anew as IG(n), and in the step S215, if the corrected IG(n) is found to be normal, the process will proceed to the step S216 to obtain GNrtn(n) by the following equation:

$$GNrtn(n) = (GNpl^2 \times Qpre)^{\frac{1}{2}} \times [\{230/IG(n)\} \times 2^{4V-2} \times (1/5)]^{\frac{1}{2}}$$

According to the above equation, the GNrtn(n) becomes a value produced by multiplying a diaphragm value F and photographing distance X together when the subject in each of the areas has a normal reflection factor. In other words, the area, $F \cdot X = GNrtn(n)$, is considered to have a subject having a normal reflection factor, which is positioned at a distance X. The area, $F \cdot X > GNrtn(n)$, is considered to have an object having a reflection factor higher than the normal reflection factor at a position X.

Also, the area, $F \cdot X < GNrtn(n)$, is considered to have an object having a reflection factor lower than the normal reflection factor at a position X. This means that the higher the reflection factor of an object is, the smaller becomes GNrtn(n).

On the other hand, in the step S215, if the IG(n) is not found to be positive, the process will proceed to step S217 to assign an extremely large number (here, 999) to the GNrtn(n) so that it can be regarded as infinity, and then proceed to step S218. In the step S218, if n=5 is found, the process will return to the processes in FIG. 7. Otherwise, it will return to the step S213 to repeat the above-mentioned processes.

Figure 15:
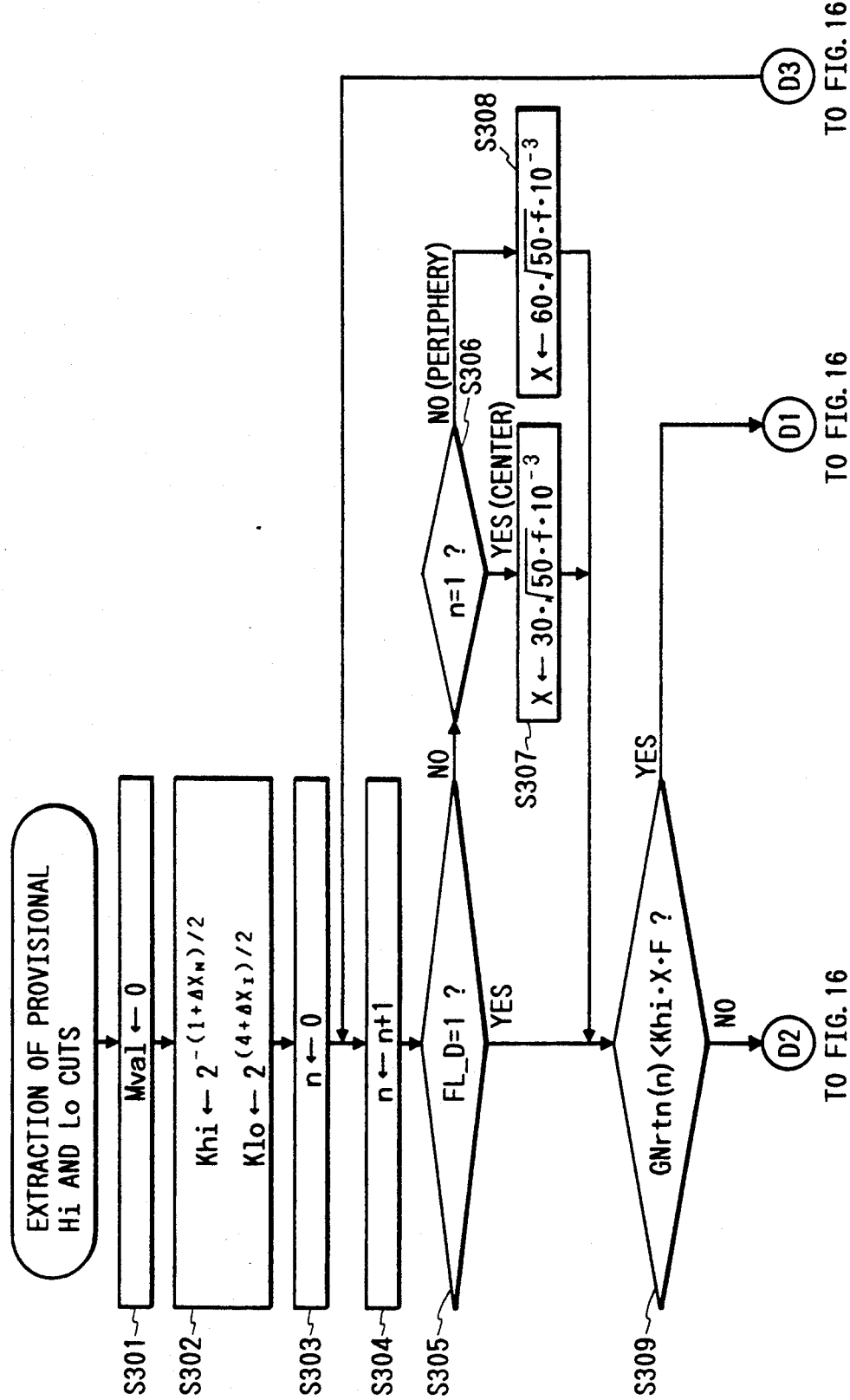
FIG. 15 is a subroutine flowchart showing the details of an extraction process of provisional cut areas.
Figure 16:
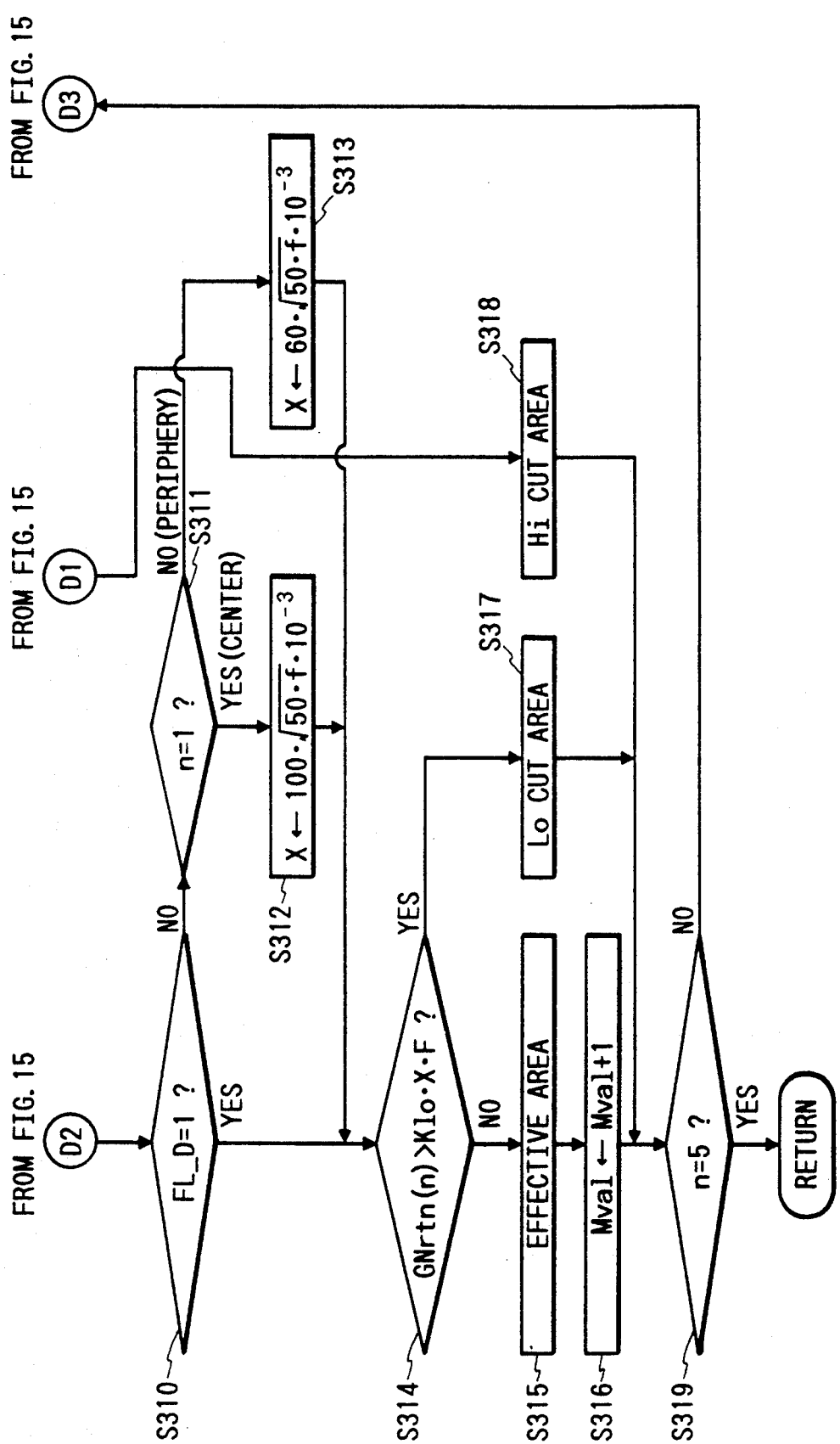
FIG. 16 is a flowchart which is continued from FIG. 15.

FIG. 15 and FIG. 16 are views showing the details of the provisional Hi and Lo cut extraction process in the step S18 (FIG. 7).

At first, in step S301, the effective area number Mval is zero reset. In step S302, using the total error obtained in the above-mentioned step S55, the following is assigned to the coefficients Khi and Klo used for the Hi cut and Lo cut which will be described later:

$$Khi = 2^{DH} \text{ (where } DH = -(1 + \Delta X_N)/2)$$

$$Klo = 2^{DL} \text{ (where } DL = +(4+\Delta X_I)/2)$$

In other words, using the minimum side error $\Delta X_N$, the coefficient for a Hi cut Khi is calculated and using the infinite side error $\Delta X_I$, the coefficient for an Lo cut Klo is calculated, respectively. Then, according to the above-mentioned equations, the greater the error $\Delta X_N$ is, the smaller becomes Khi, and also, the greater the error $\Delta X_I$ is, the larger becomes Klo. This is because if the error is greater, the cut coefficients Khi and Klo are given in the direction for the Hi cut and Lo cut, which will be described later, and it becomes more difficult for them to be provisional, that is, it is easier for them to become effective areas, the order to avoid any disadvantage that the area including the main subject may also be cut off if the detection error regarding the photographing distance and other is great. For example, if the total errors $\Delta X_N$ and $\Delta X_I$ are both zero, Khi=0.71 and Klo=4, and if the total errors $\Delta X_N$ and $\Delta X_I$ are both 1 EV, Khi=0.5 and Klo=5.66.

Subsequently, in step S303, n is zero reset and in step S304, n is incremented by 1. Then, in step S305, whether the flag FL_D is 1 or not is examined. Here, if the flag FL_D is not 1, it means that any photographing distance X has not been detected. If the step S305 is affirmative, that is, when the photographing distance X has been detected, the process will proceed to step S309, and if it is negative, to step S306. In the step S306, if the condition n=1 is confirmed, that is, when a calculation is executed for the central portion, the process will proceed to step S307 to assign the following to the photographing distance X:

$$X = 30 \cdot (50 \cdot f)^{\frac{1}{2}} \cdot 10^{-3}$$

then to step S309. Here, f is a focal length of the photographic lens.

Also, if the n is not 1, that is, when a calculation is executed for the peripheral portion, the process will proceed to step S308 to make the photographing distance X as follows;

$$X = 60 \cdot (50 \cdot f)^{\frac{1}{2}} \cdot 10^{-3}$$

then to the step S309.

In the step S309, whether the GNrtn(n) calculated in the above-mentioned step S216 (FIG. 14) is $$GNrtn(n) < Khi \cdot X \cdot F$$

or not is examined. If it is negative, the process will proceed to step S310 in FIG. 16, and if affirmative, to S318 in FIG. 16 with an assumption that there is an object having a high reflectivity such as a gold screen or mirror in the area or there is a subject (other than the main subject) in the side nearer than the photographing distance. Then, after defining such area as a provisional Hi cutarea, the process will proceed to step S319.

In this respect, even if any photographing distance X cannot be detected, it is determined in the step S309 by the use of the value to be gained in the step S307 or S308 that there is an object having a high reflectivity if the value of GNrtn is definitely very small, and such an area is defined to a provisional area for Hi cut. Here, in the steps S307 and S308, it is designed that the value for the step S307 is made smaller. This is because the main subject is more likely to be positioned in the central portion and, therefore, in order to reduce the possibility that the main subject in the central portion is cut off, it is made more difficult for the central portion to be a provisional Hi cut area than the peripheral portion.

In step S310 in FIG. 16, whether the flag FL_D is 1 or not is again examined. If affirmative, the process will proceed to step S314 and if negative, to step S311. In the step S311, if the condition n=1 is confirmed, that is, when a calculation is performed for the central portion, the process will proceed to step S312 to make the film-to-object distance X as follows:

$$X = 100 \cdot (50 \cdot f)^{\frac{1}{2}} \cdot 10^{-3}$$

then proceed to step S314. Also, if n is not 1, that is, when a calculation is performed for the peripheral portion, the process will proceed to step S313 to make the photographing distance X as follows:

$$X = 60 \cdot (50 \cdot f)^{\frac{1}{2}} \cdot 10^{-3}$$

then proceed to step S314.

In the step S314, whether the GNrtn (n) calculated in the above-mentioned step S216 (FIG. 14) is $$GNrtn(n) > Klo \cdot X \cdot F$$

or not is determined. If negative, the process will proceed to step S315 and if affirmative, to S317 with an assumption that there is an object having a low reflectivity in such area (for example, wherebackground is missing) and make the area as a provisional Lo cut area, and then proceed to step S319.

In this respect, even if any photographing distance cannot be detected, it is determined by in the step S314 the use of the value to be gained in the step S312 or S313 that there is an object having a low reflectivity if the value of GNrtn is very large definitly, and such an area is defined to be a provisional Lo cut area. Here, in the steps S312 and S313, it is designed that the value for the step S312 is made larger. This is because the main subject is more likely to be positioned in the central portion and, therefore, in order to reduce the possibility that the main subject in the central portion is cut off it is made more difficult for the central portion more to be a provisional Lo cut area than the peripheral portion.

Also, if the step S309 and step S314 are both negated, such area is defined as a provisional effective area and in step S316, the effective area number Mval is incremented by 1 and the process will proceed to step S319. In the step S319, whether n=5 or not is examined, that is, a judgment is made as to whether the above-mentioned processes have been executed for all the areas or not, and if negative, the process will return to the step S304, and if affirmative, return to the processes shown in FIG. 7.

According to the processes in FIG. 15 and FIG. 16, if the GNrtn (n) calculated on the basis of the photometric signals at the time of preliminary flash emission for each of the areas is $$GNrtn(n) < Khi \cdot X \cdot F \qquad (1)$$

such area becomes a provisional Hi cut area, and if it is $$GNrtn(n) > Klo \cdot X \cdot F \qquad (2)$$

such area becomes a provisional Lo cut area, and if it is $$K_{hi} \cdot X \cdot F \leq GN_{rtn}(n) \leq K_{lo} \cdot X \cdot F$$

such area becomes a provisional effective area. In other words, the area, where the photometric value at the time of preliminary flash emission is within a predetermined range, becomes a provisional effective area while the area out of the predetermined range becomes a provisional cut area.

Here, there is a possibility that the detected photographing distance X tends to be a value farther than the actual photographing distance by the above-mentioned minimum side error. Consequently, if a judgment should be made in accordance with above-mentioned expression (1) without adding this error, there is a fear that the area for which no Hi cut should be given (the area where the main subject is present) is Hi cut. However, in the present embodiment, the above-mentioned judgment is made by the use of the Hi cut coefficient Khi which becomes smaller as the minimum side error $\Delta X_N$ becomes greater as described above. Therefore, if the error $\Delta X_N$ is greater, it becomes more difficult for such area to be Hi cut. In other words, it is possible to minimize a disadvantage such as a Hi cut being given to the area where the main subject is present.

Also, there is a possibility that the detected photographing distance X tends to be a value nearer than the actual photographing distance by an amount of the above-mentioned infinite side error. Consequently, if a judgment should be made in accordance with the above-mentioned expression (1) without adding this error, there is a fear that the area where any Lo cut should not be given (the area in which the main subject is present) is likely to be Lo cut. However, in the present embodiment, the above-mentioned judgement is made by the use of the Lo cut coefficient Klo which becomes smaller as the infinite side error $\Delta X_1$ becomes greater as described above. Therefore, if the error $\Delta X_1$ is greater, it becomes more difficult for such area to be Lo cut. In other words, it is possible to minimize a disadvantage that a Lo cut is given to the area where the main subject is present.

In this respect, the minimum side error for the closest photographing distance (encoder position 16) and the infinite side error for the fartherest photographing distance (encoder position 1) are both 9.9 (which is a value regarded as infinity) in the above-mentioned FIG. 11. In this case, therefore, the coefficient Khi of the Hi cut is of an extremely small value and at the same time, the coefficient Klo of the Lo cut is of an extremely large value. When the encoder positions are 1 and 16, the film-to-object distance detection error becomes considerably large and makes to the reliability of detected values extremely low. Hence this measure is needed to protect every area from being cut in consideration of safety in conducting a desirable photography.

FIG. 17 to FIG. 22 are views showing the details of the process in the step S19 in FIG. 7.

This process is required to determine the final light adjusting area and obtain the light adjusting correction value $\Delta Y$. The light adjusting correction value $\Delta Y$ is a value used for giving a gain for each of the gain setters 52a to 52e of the above-mentioned light adjusting circuit 50 at the time of main flash emission in step S504 in FIG. 23 which will be described later. In a case of $\Delta Y > 0$, the flashing amount becomes great because the larger the value is, the slower becomes the suspension time of main falsh emission. Also, in a case of $\Delta Y < 0$, the flashing amount becomes small because the larger the $|\Delta Y|$ is, the quicker becomes the suspension time of main flash emission.

Figure 17B:
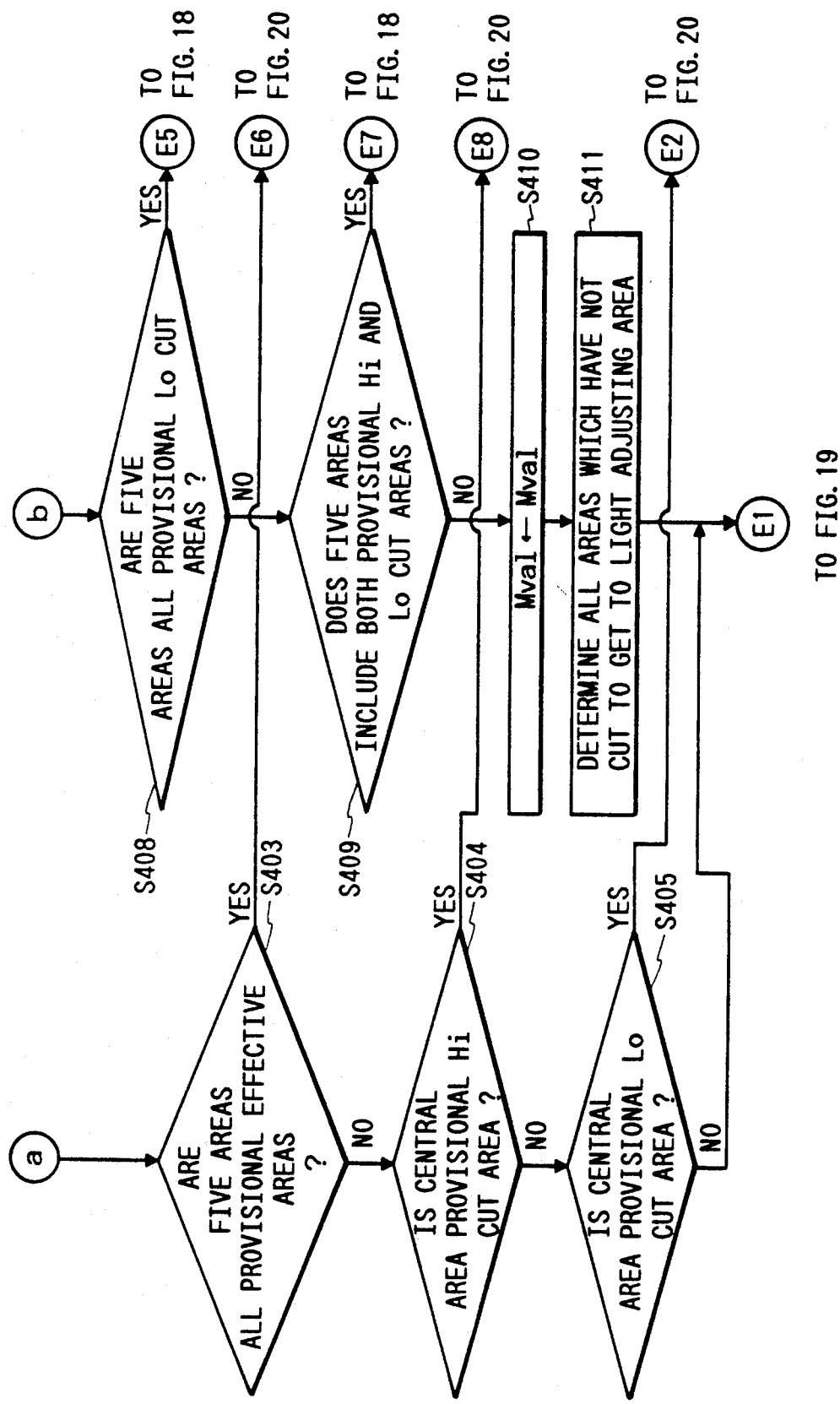
FIG. 17A and B is a subroutine flowchart showing the details of processes to determine light adjusting areas and calculate light adjusting correction amounts.
Figure 19:
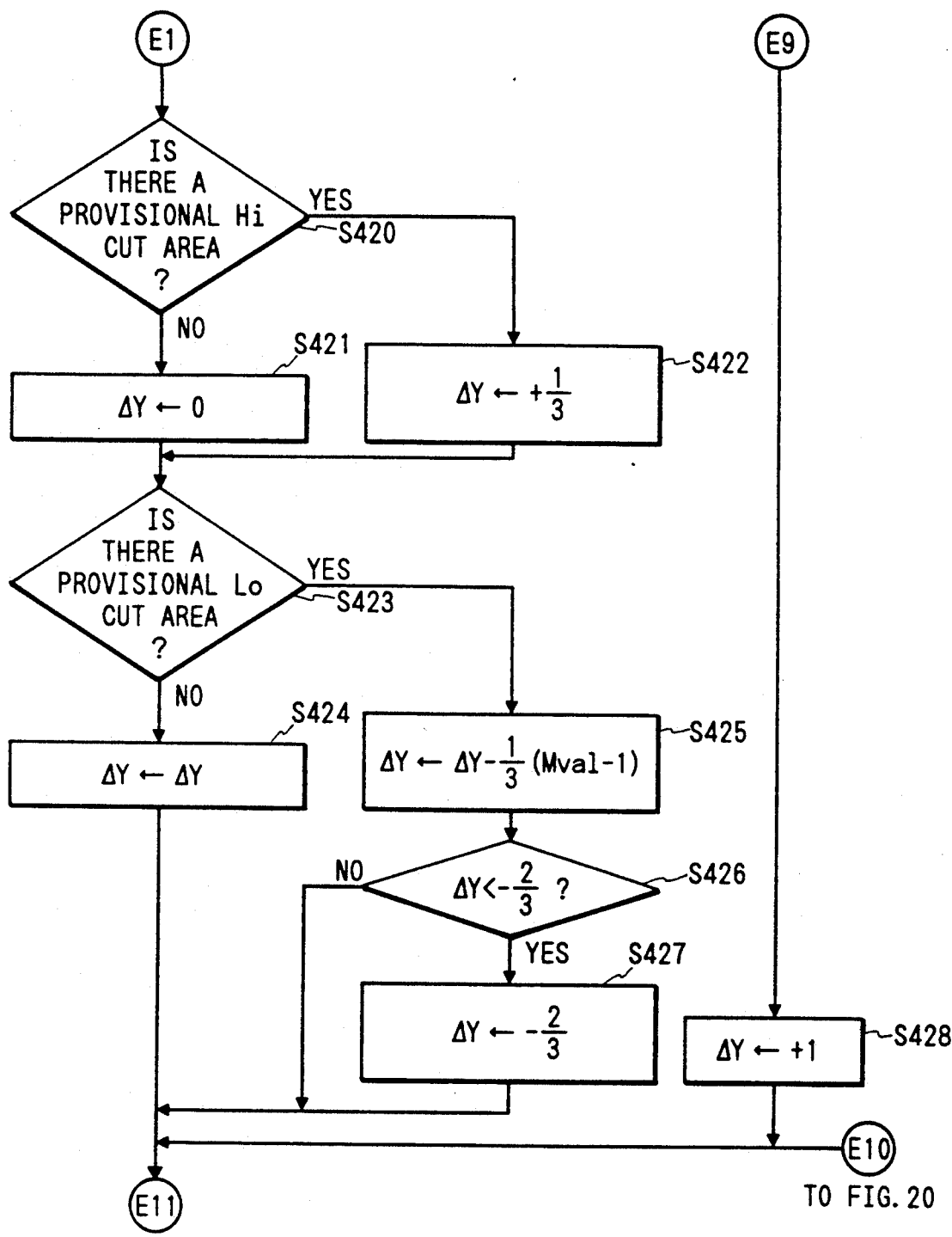
FIG. 19 is a flowchart which is continued from FIG. 17 and FIG. 18.

In FIG. 17, whether the above-mentioned flag FA_SC is 1 or not is examined in step S401. If it is 1, that is, the main subject is conceivably in the center portion of the image plane, the process will proceed to step S402 to set the light adjusting area in the central portion finally, and then to step S403. In the step S403, if it is confirmed that all the five results of judgments in FIG. 15 and FIG. 16 are of provisional effective area, the process will proceed to step S431 in FIG. 20 or otherwise, to step S404. In the step S404, if it is found that the central portion is a provisional Hi cut area, the process will proceed to step S430 in FIG. 20 or otherwise, to step S405. In the step S405, if it is found that the central portion is a provisional Lo cut area, the process will proceed to step S429 in FIG. 20 or otherwise, to step S420 in FIG. 19.

Figure 20:
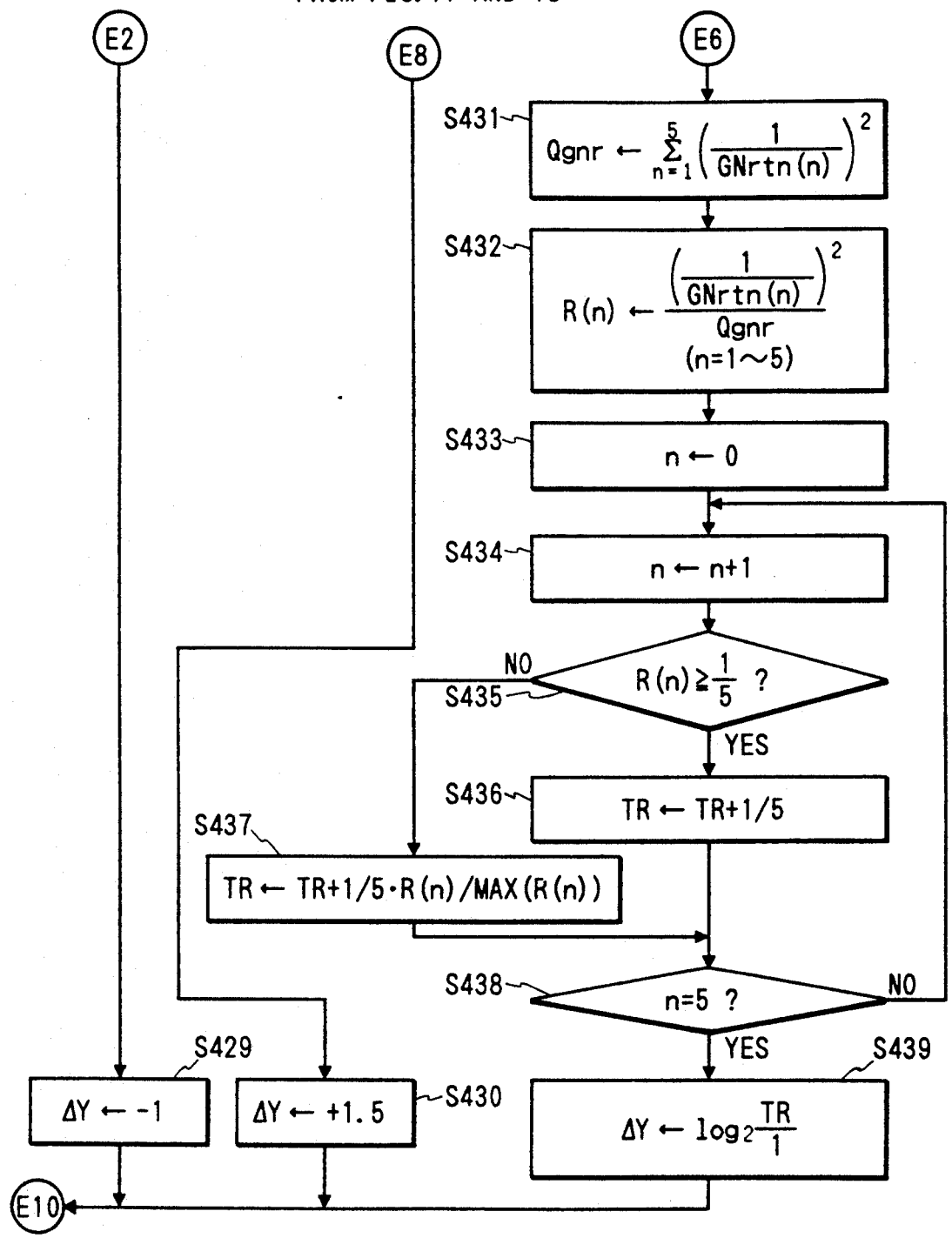
FIG. 20 is a flowchart which is continued from FIG. 17 and FIG. 18.

On the other hand, in step S401, if the FA_SC is not found to be 1, that is, there is conceivably no main subject in the central portion, the process will proceed to step S406. The processes in steps S406 to S409 are to find in accordance with the results of the processes in the above-mentioned FIG. 15 and FIG. 16; (1) whether all the five areas are of the provisional effective areas or not; (2) whether all the five areas are of the provisional Hi cut areas or not; (3) whether all the five areas are of the provisional Lo cut areas or not; (4) whether all the five areas are of the provisional cut areas and there is a mixture of Hi·cut and Lo cut areas or not; and (5) whether cut areas and effective areas are mixed or not. Then, on the basis of the results of these findings the, following process will be executed:

(1) All the five areas are of the provisional effective areas:

In this case, the step S406 is affirmed, and the process will proceed to step S418 in FIG. 18 to make the effective area number Mval to be five and at the same time, define all the five areas finally as light adjusting areas, and then proceed to step S431 in FIG. 20. In the step S431 the value Qgnr (total sum of the photometric values at the time of preliminary flash emission in the five areas) is calculated by the following equation:

$$Qgnr = \Sigma (1/GN_{rtn}(n))^2$$

Here, $\Sigma$ represents the sum total calculation, n=1 to 5. Subsequently, in step S432, the photometric signal distribution R(n) for each of the areas is obtained by the following equation with condition that the total sum of the photometric values for the five areas is 1:

$$R(n) = (1/GN_{rtn}(n))^2 / Qgnr$$

where (n=1 to 5)

In step S433, n is zero set, and in steps S434 to S438, the processes are executed to obtain TR on the basis of the distribution R (n) (n=1 to 5) for the five areas. In other words, if the R (n) is 1/5 or more, the 1/5 is added to the last TR to make it a new TR. If the R (n) is less than 1/5, the following is added to the last TR to make it a new TR:

$$TR + (1/5) \times R(n) / MAX(R(n))$$

Here, the MAX (R (n)) is the maximum value of R (n). In step S439, using the TR which has been obtained finally as mentioned above, the light adjusting correction amount ΔY is obtained by the following:

$$\Delta Y = \log_2 (TR / 1)$$

As described above, the light adjusting correction amount ΔY is obtained on the basis of the distribution of the photometric signals for each of the areas. Therefore, it becomes possible to control the suspension time of the main flash emission accurately in the main flash emission processes in FIG. 23 and FIG. 24 which will be described later.

(2) All the five areas are of the provisional Hi cut areas:

In this case, when step S407 in FIG. 17 is affirmed, the process will proceed to step S416 in FIG. 18 to assign 1 to the Mval and at the same time, to cause GNrtn (n) to define the largest area finally as a new light adjusting objective area in step S417. That the GNrtn (n) is the largest means that the photometric signal at the time of preliminary flash emission is the smallest. In other words, it is the closest to the above-mentioned predetermined region for determining whether the area is a Hi cut area or not, and this area is considered to be an area which receives the smallest influence from an object having a high reflectance. However, if there are a plurality of such areas, a priority is given to the area having a smaller area number. Then, proceeding to step S430 in FIG. 20, the process is executed to assign +1.5 to the light adjusting correction amount ΔY. In other words, if all the areas are of the provisional Hi cut areas, the adjusting light suspension time is delayed more than usual in order to prevent under exposure.

(3) All the areas are of the provisional Lo cut areas:

In this case, when step S408 in FIG. 17 is affirmed, the process will proceed to step S414 in FIG. 18 to assign 1 to the Mval and at the same time, to cause GNrtn (n) to define the smallest area finally as a new light adjusting objective area in step S415.

That the GNrtn (n) is the smallest means that the photometric signal at the time of preliminary flash emission is the largest. In other words, it is the closest to the above-mentioned predetermined region for determining whether the area is a cut area or not, and this area is considered to be an area which is scarcely influenced by the fact that the flash reflection light is not returned. However, if there are a plurality of such areas, a priority is given to the area having a smaller area number. Then, proceeding to step S429 in FIG. 20, the process is executed to assign −1 to the light adjustment correcting amount ΔY. In other words, if all the areas are of the provisional Lo cut areas, the adjusting light suspension time is quickened more than usual in order to prevent over exposure.

(4) All the areas are of the provisional cut areas and there is a mixture of Hi cut and Lo cut areas:

In this case, when step S409 in FIG. 17 is affirmed, the process will proceed to step S412 in FIG. 18 to assign 1 to the Mval and at the same time, to cause GNrtn (n) to define the largest area in the provisional Hi cut areas finally as a new light adjusting objective area in step S413. Then, further, in step S428, the light adjusting correction amount ΔY is made +1. In other words, the provisional Lo cut area has a missing rear portion where no object exists whereas the provisional Hi cut area should have as object of a high reflectance (a gold screen or mirror, for example) without fail, and it is conceivable that a main subject is covered with this provisional Hi cut area. Therefore, the ΔY is made +1 in order to eliminate both influences from the object having a high reflectance and the object having a low reflectance.

(5) The provisional cut area and effective area are mixed:

In this case, when step S409 in FIG. 17 is negated, the process will proceed to step S410 to set the Mval at the Mval obtained in the above-mentioned step S316 (FIG. 16) and at the same time, to define the provisional effective area as the light adjusting objective area finally in step S411. Subsequently, the process will proceed to step S420 in FIG. 19 to examine whether there is any provisional Hi cut area or not. If there is even one provisional Hi cutarea, the light adjusting correction amount ΔY is made +⅓ in step S422. If there is no provisional Hi cut area at all, the ΔY is made zero in step S421. Then, the process will proceed to step S423. In the step S423, whether there is any provisional Lo cut area or not is examined. If there is any provisional Lo cut area, the correction amount is made as follows in step S425;

$$\Delta Y = \Delta Y - (\tfrac{1}{3}) \times (Mval - 1)$$

Then, in steps S426 and S427, a limit of −⅔ is given to the ΔY. If there is no provisional Lo cut area, the ΔY at that time is made a new ΔY in step S424.

In other words, when a provisional Hi cut area is present, there is an object having a high reflectance as desicribed above, and there is a tendency that even if an adjacent area is not any Hi cut area, such an area is influenced by the high reflective object. Here, therefore, the ΔY is made +⅓.

Then, the description will be made of the case where there is an provisional Lo cut area.

Now, a consideration is given to the case where no background scene exists behind the main subject. In this case, the number of effective areas is different depending on whether such a subject is located in the end portion of an image plane or is located in the central portion thereof even when the magnification of the subject is one and the same. In other words, when it is located in the end portion, the number of areas containing the subject becomes less. Thus reducing the effective areas (the areas which are not Lo cut). Also, when the subject is located in the position close to the center of the image plane, the number of areas containing the subject becomes many. Hence increasing the effective areas. Then, if the magnification of a subject is one and the same, the effective area, that is, the area occupied by the subject in each of the areas, becomes smaller as the number of areas containing the subject becomes greater, and the photometric signals at the time of preliminary flash emission also become small accordingly. Therefore, in the present embodiment, the ΔY is made greater in the minus side when the effective area number Mval is large as indicated in the equation shown in the above-mentioned step S425.

Figure 21:
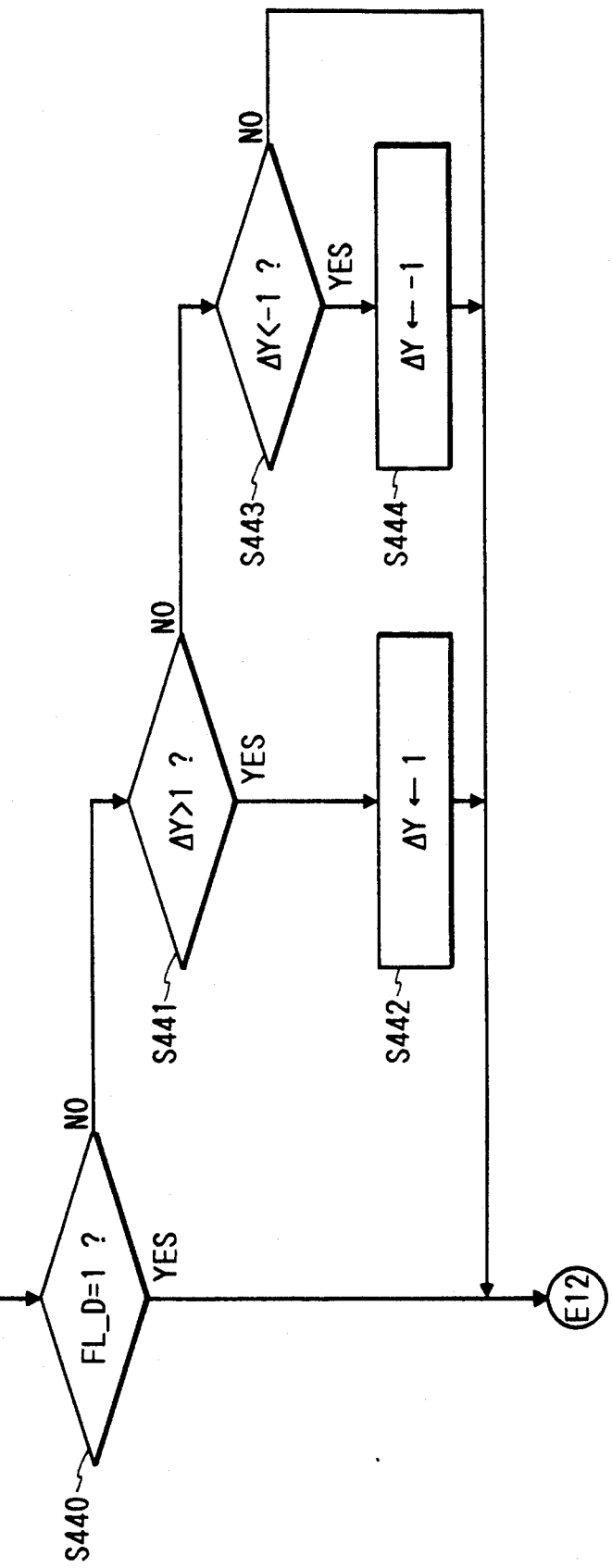
FIG. 21 is a flowchart which is continued from FIG. 19.
Figure 22:
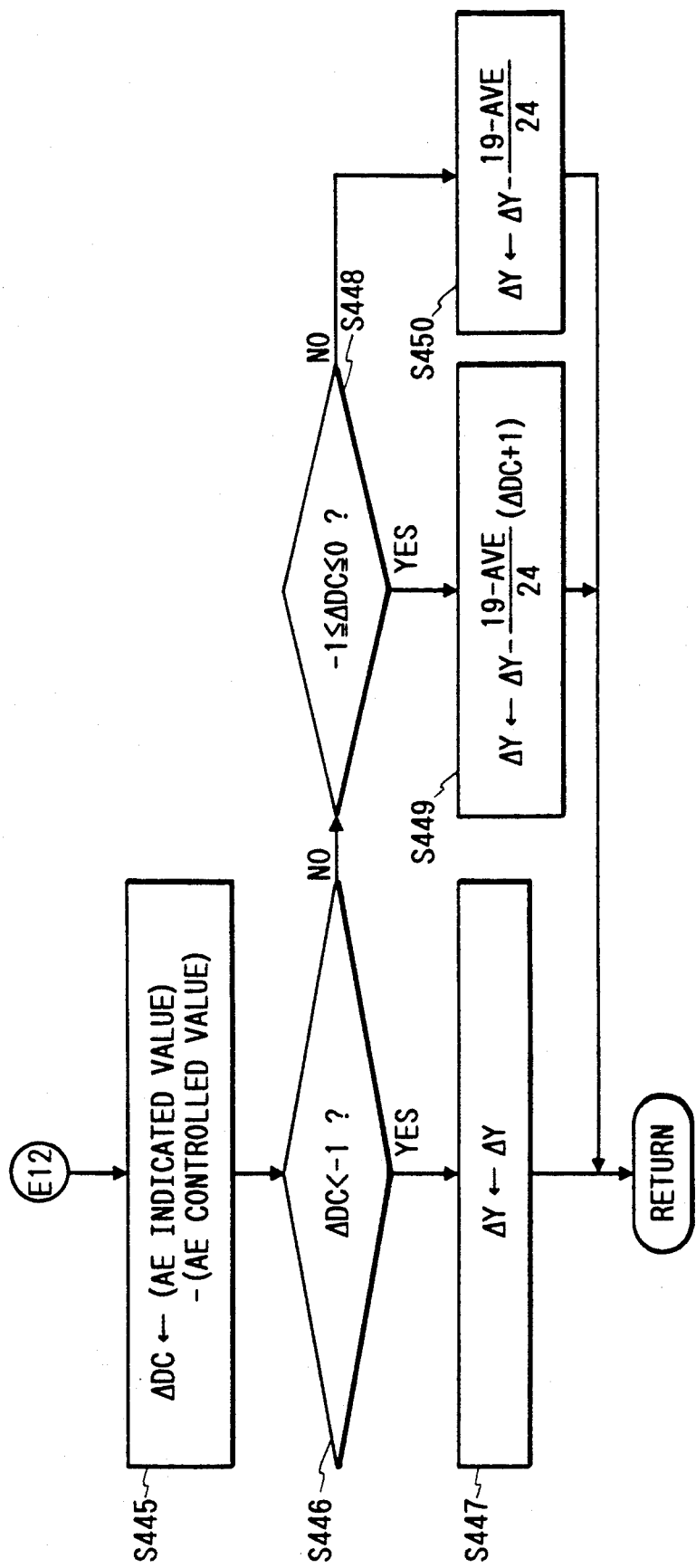
FIG. 22 is a flowchart which is continued from FIG. 21.

Subsequent to the steps S424, S427, and S428, the process will proceed to step S440 in FIG. 21 to examine whether the flag FL_D is 1 or not, and if it is 1, proceed to step S445 is FIG. 22. If it is not 1, any detection of photographing distance X cannot be executed. Thus, the process will proceed to step S441. Unless a photographing distance X can be detected, it is not safe to set any large value for ΔY. Accordingly, a limit of −1 to +1 is provided for the ΔY which has been calculated as mentioned above in steps S441 to S444.

In step S445 in FIG. 22, from the ideal exposure value of a static light calculated by a camera, that is, an AE indicating value, an AE control value at which an actual control is executed is subtracted, and the value thus obtained is given as a ΔDC. Such a case where the ΔDC is not zero means the case in which a photography is conducted with manual exposure, strobe synchronous seconds have reached a limited value to cause it to be out of the inter-locking range, or the like. In steps S446 to S450, the ΔY is corrected again in accordance with the value of ΔDC.

In the step S446, if the ΔDC is found to be less than −1, that is, when the control of the static light is conducted by controlling with a value under 1 EV, it is not corrected again and the ΔY is defined as it is in the step S447. Also, when the ΔDC is −1≦ ΔDC≦0, the correction is made by making the strobe light rather small by the extent to which the static light illuminates the main subject in accordance with the following equation:

$$\Delta Y = \Delta Y - ((19 - AVE)/24) \times (\Delta DC + 1)$$

Here, the AVE represents an average of the five luminances (BV) of the stationary light obtained by the segmented photometric device 8. Therefore, the darker it is and also the greater the ΔDC is, the more is the ΔY corrected in the minus direction. Further, when the ΔDC is 0<ΔDC, the same correction is made in accordance with the following equation:

$$\Delta Y = \Delta Y - ((19 - AVE)/24)$$

Figure 23:
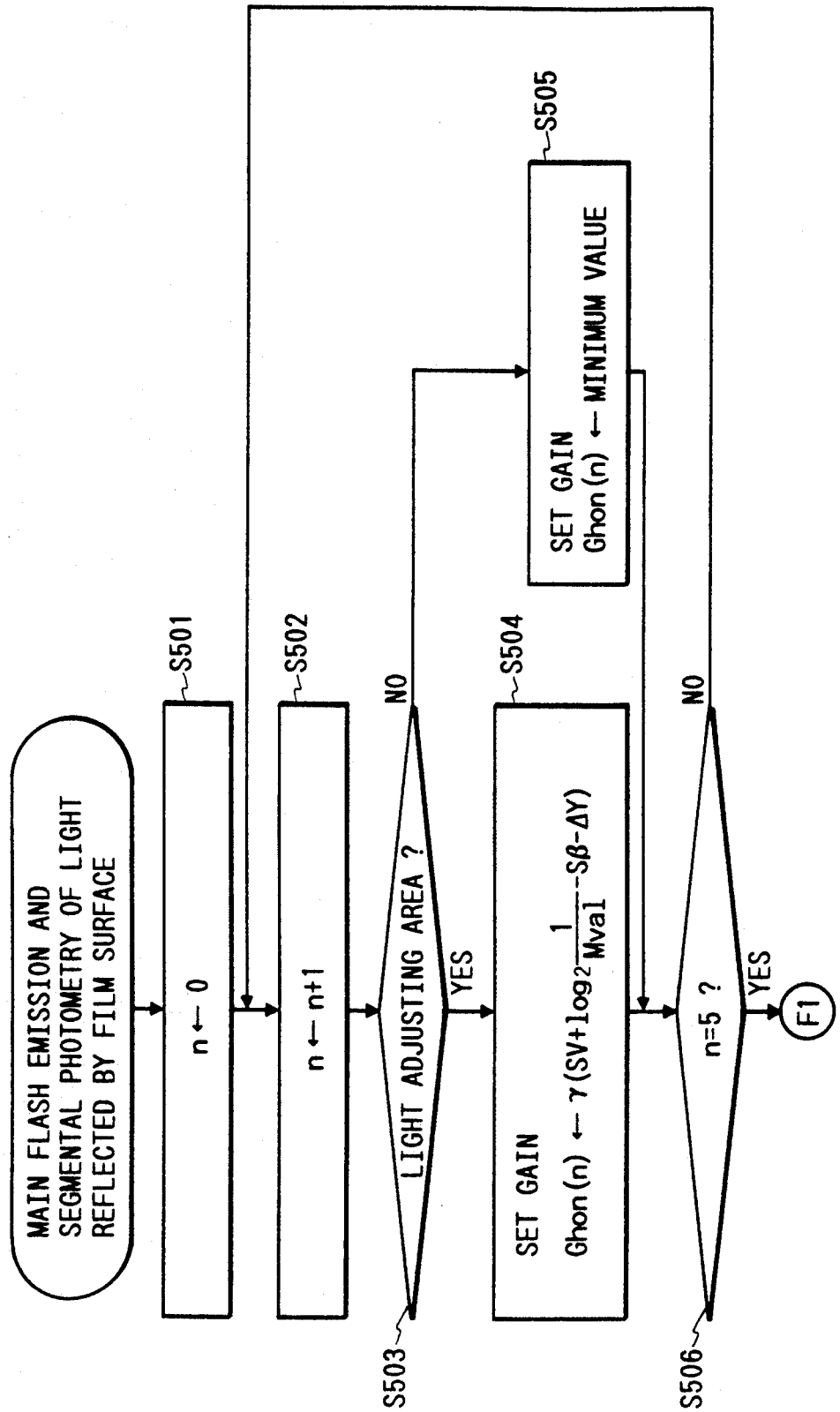
FIG. 23 is a subroutine flowchart showing the details of a light adjusting process at the time of main flash emission.
Figure 24:
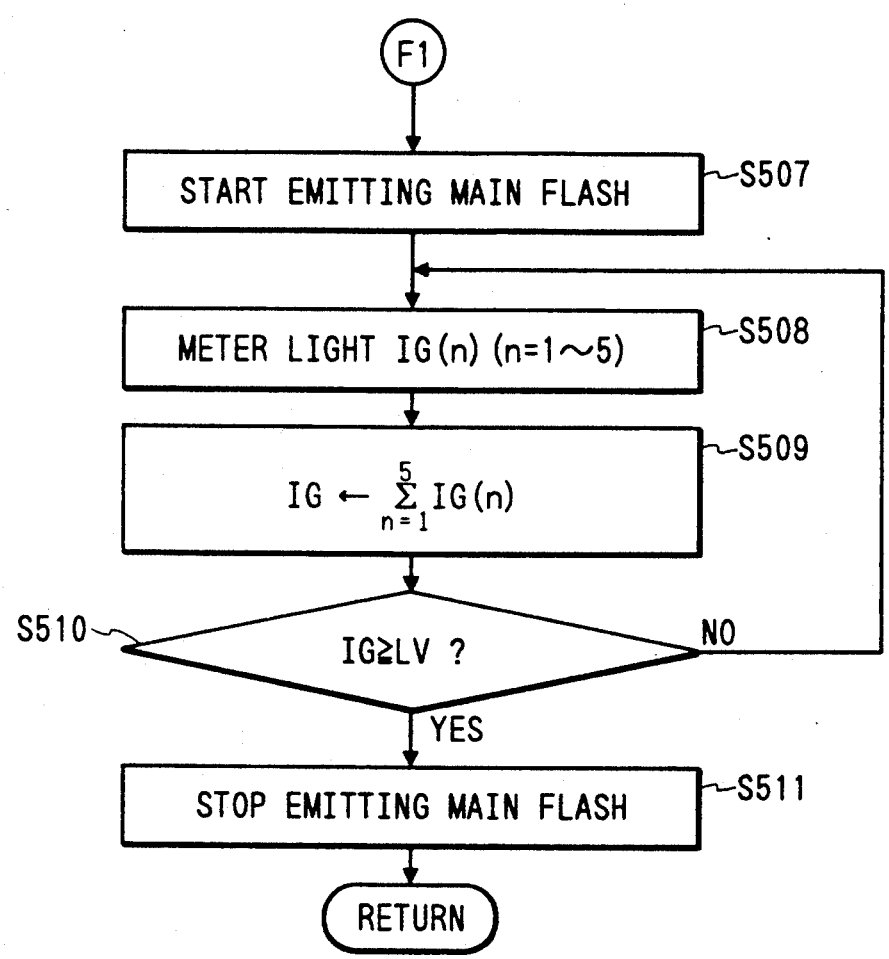
FIG. 24 is a flowchart which is continued from FIG. 23.

FIG. 23 and FIG. 24 are views showing the details of the main flash emission process in the step S20 in FIG. 7.

In step S501 is FIG. 23, n is zero reset, and then in step S502, the n is incremented by 1 to examine whether the area indicated by n is a light adjusting objective area or not in step S503. If the step S503 is negated, the process will proceed to step S505 to define the gain Ghon (n), which is given to the gain setters 52a to 52e of the light adjusting circuit 50, to be a value which is sufficiently small (−10, for example) and then, proceed to step S506. On the other hand, if the step S503 is affirmed, the Ghon (n) is obtained in step S504 by the following equation using the light adjusting correction amount ΔY obtained in the process described above:

$$Ghon\ (n) = \gamma(SV + \log_2(1/Mval) - S\beta - \Delta Y)$$

Then, the process will proceed to step S506. Here, the SV is a film ISO speed, Sβ is a lens correction coefficient obtained in the step S19, ΔY is a light adjusting correction amount, and γ is a constant. In step S506, whether n=5 or not is determined, and if it is negated, the process will return to the step S502 to repeat the above-mentioned processes If affirmed, the process will proceed to step S507 in FIG. 24.

Addording to the processes hitherto executed, the gains Ghon (1) to Ghon (5) are given to the gain setters 52a to 52e, respectively.

In the step S507, the main flash emission of the electronic flash apparatus 11 is started and in step S508, its photometry is executed. In other words, the illuminated light from the main flash emission is reflected by the subject and reflected by the film surface through the photographic lens 2. Then, the reflected light is received by each of the five light receiving elements 13a to 13e. The photometric signals IG (1) to IG (5) of the light receiving elements 13a to 13e are inputted respectively into the amplifiers 51a to 51e of the light adjustment circuit 50.

The amplifiers 51a to 51e amplify the photometric signals IG (1) to IG (5) by the gains Ghon (1) to Ghon (5) set by the gain setters 52a to 52e and input them into the adder circuit 54. The adder circuit 54 adds the amplified signals thus inputted. The integrating circuit 55 integrates by times the results of the addition by the adder circuit 54, that is, the total sum of the amplified photometric signals IG (1) to IG (5) and makes such integrated value as IG (step S509).

On the other hand, the light adjusting level LV which has been set in advance is output to a conversion circuit 56. The conversion circuit 56 converts this into analogue signals. This converted light adjusting level and the output IG of the above-mentioned integrating circuit 55 are inputted into a comparator 57. The comparator 57 determines whether the IG has reached the above-mentioned light adjusting level LV or not (step S510). If this is negated, the process will return to the step S508. If affirmed, the process will proceed to step S511 to control the flash controlling circuit 38 of the electronic flash apparatus 11 so that the above-mentioned flash emission is suspended, and then terminate this processing.

According to the procedures in FIG. 23 and FIG. 24, the gain Ghon (n) is obtained on the basis of the light adjusting correction amount ΔY, and when the ΔY>0, the flash suspension time for the main flash emission is delayed to make the flashing amount larger if such value is greater. Also, when the ΔY<0, the flash suspension time for the main flash emission is quickened to make the flashing amount smaller if the |ΔY| is greater.

So far the description has been made of the procedures for the CPU 31 to control a flash photography. According to the procedures, the photometric values at the time of preliminary flash emission, the photographing distances X inputted from the photographic lens 2, and the detection error for the photographing distances ΔX are used for determining the photometric areas (effective areas) which are allowed to contribute to light adjustment at the time of main flash emission. Then, the light adjustment is performed at the time of main flash emission using the photometric values of the effective areas. In this way, an additional consideration is given to the detection error for the photographing distances when the areas contributing to light adjustment at the time of main flash emission are determined. Hence making it possible to discriminate the effective areas and cut areas even when the detection accuracy of the photographing distances is not quite excellent.

In the structure according to the above-mentioned embodiment, an electronic flash apparatus 11 constitutes a flash apparatus 101, a light receiving element 13 and light adjusting circuit 50 constitute a photometric device 102, a CPU 31 constitutes a light adjusting area determining device 103, and the CPU 31 and light adjusting circuit 50 constitute a light adjusting device 104, respectively.

As described in this respect, while the field is divided into the central area and four peripheral areas, totaling five areas, its method of division and number of the divided areas are not limited thereto. Also, the values of the photographing detection errors are not limited to those shown in FIG. 11. Further, although there has been shown an example in which the detection error on the photographic lens side and the one on the camera body side are both used as the above-mentioned detection errors, it may be possible to adopt either one of them for the purpose.

According to a camera of the present invention, the photometric areas which are allowed to contribute to light adjustment at the time of main flash emission are determined with the consideration of the detection errors for photographing distances in addition to the photometric values and photographing distances at the time of preliminary flash emission. It is therefore possible to minimize cutting an area which should not be cut essentially (such as an area where a main subject is present) particularly when the detection accuracy of a photographing distance becomes inferior as in the case of a photographing distance being far or the focal length of a photometric lens being short. Hence enabling to enhance the probability to obtain a correct exposure.

Also, exchangeable lenses according to the present invention have a detection device for detecting photographing distances and a storage in which the detection errors are stored for the corresponding photographing distances. It is therefore possible to perform the above-mentioned control in a camera by inputting the photographing distances and detection errors for the photographing distances mentioned above into the camera.

What is claimed is:

1. An automatic light adjustment camera including the following:
    flashing means capable of performing preliminary flash emission and main flash emission;
    photometric means for dividing the light beam emitted from said flashing means and reflected by a field into a plurality of photometric areas for photometry and outputting each photometric value;
    light adjusting area determining means for determining at least one photometric area which is allowed to contribute to light adjustment at the time of said main flash emission on the basis of said photometric values, at the time of preliminary flash emission, a photographing distance, and at least one detection error for said photographing distance; and
    light adjusting means for performing light adjustment at the time of said main flash emission on the basis of said at least one light adjusting area determined by said light adjusting area determining means.

2. An automatic light adjustment camera according to claim 1, wherein
    said light adjusting area determining means uses the photographing distance detected by photographing distance detecting means provided in a mounted photometric lens.

3. An automatic light adjustment camera according to claim 1, wherein
    said light adjusting area determining means uses said at least one detection error which is output from storage means provided in a mounted photometric lens in accordance with the photographing distances.

4. An automatic light adjustment camera according to claim 3, wherein
    said light adjusting area determining means uses said at least one detection error which is output from storage means provided in a mounted zoom lens in accordance with photographing distance and a focal length.

5. An automatic light adjustment camera according to claim 3, wherein
    said light adjusting area determining means uses both long distance side error and short distance side error for the nominal value of photographing distance which is output from storage means provided in a mounted photometric lens.

6. An automatic light adjustment camera according to claim 5, wherein
    said light adjusting area determining means calculates a first given amount for determining whether such amount should be allowed to contribute to said light adjustment or not on the basis of said short distance side and at the same time, makes the photometric area having a photometric value at the time of preliminary flash emission which exceeds said first given amount an area which is not allowed to contribute to the light adjustment.

7. An automatic light adjustment camera according to claim 5, wherein
    said light adjusting area determining means calculates a second given amount for determining whether such amount should be allowed to contribute to said light adjustment or not on the basis of said long distance side and at the same time, makes the photometric area having a photometric value at the time of preliminary flash emission which exceeds said second given amount an area which is not allowed to contribute to the light adjustment.

8. An automatic light adjustment camera according to claim 1, wherein
    said light adjusting area determining means performs said determination in such a manner that the greater the detection error for said photographing distance, the higher is the probability that the respective photometric area is allowed to contribute to said light adjustment.

9. An automatic light adjustment camera according to claim 1, wherein
    said light adjusting area determining means uses said at least one error at the time of focus detection.

10. An automatic light adjustment camera according to claim 9, wherein
    said at least one error at the time of focus detection is determined in accordance with photographing distance and a focal length.

11. A photographic exchangeable lens mountable on an automatic light adjustment camera according to claim 1, including the following:
    detection means for detecting the photographing distances;
    storage means for storing in advance said at least one detection error which correspond to the photographing distances.

12. A photographic exchangeable lens according to claim 11, wherein said exchangeable lens is capable of varying its focal lengths, and
    in said storage means, said at least one error which corresponds to the focal length and the photographing distance is stored.

13. A photographic exchangeable lens according to claim 11, wherein
    there are stored in said storage means the long distance side error and short distance side error for the nominal values of the photographing distances.

* * * * *